US010699533B2

(12) United States Patent
Hirai et al.

(10) Patent No.: US 10,699,533 B2
(45) **Date of Patent: *Jun. 30, 2020**

(54) GAMING MACHINE AND METHODS OF OPERATING GAMING MACHINES TO PROVIDE SKILL-BASED WAGERING GAMES TO PLAYERS

(71) Applicant: Konami Gaming, Inc., Las Vegas, NV (US)

(72) Inventors: Tomoaki Hirai, Las Vegas, NV (US); Toru Omoto, Las Vegas, NV (US)

(73) Assignee: Konami Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/158,051

(22) Filed: Oct. 11, 2018

(65) Prior Publication Data

US 2019/0188974 A1 Jun. 20, 2019

Related U.S. Application Data

(63) Continuation of application No. 15/261,775, filed on Sep. 9, 2016, now Pat. No. 10,121,328.

(51) Int. Cl.
*A63F 9/24* (2006.01)
*A63F 13/00* (2014.01)
(Continued)

(52) U.S. Cl.
CPC ...... *G07F 17/3295* (2013.01); *G07F 17/3209* (2013.01); *G07F 17/3211* (2013.01); *G07F 17/3227* (2013.01); *G07F 17/3244* (2013.01)

(58) Field of Classification Search
CPC ... G07F 17/32; G07F 17/3295; G07F 17/3204
See application file for complete search history.

(56) References Cited

U.S. PATENT DOCUMENTS

2011/0212766 A1* 9/2011 Bowers .................. G07F 17/32 463/25
2012/0115579 A1* 5/2012 Buecheler .......... G07F 17/3239 463/23

(Continued)

OTHER PUBLICATIONS

International Search Report and Written Opinion (International Application No. PCT/US2017/049698) dated Nov. 13, 2017; 12 pages.

(Continued)

*Primary Examiner* — Kang Hu
*Assistant Examiner* — Jason Pinheiro
(74) *Attorney, Agent, or Firm* — Howard & Howard Attorneys PLLC

(57) ABSTRACT

A gaming machine for providing a skill-based wagering game to a player is described herein. The gaming machine includes a controller programmed to display the skill-based wagering game on a display device, receive a signal indicating a wager being received from the player, and initiate the skill-based wagering game. The controller generates a skill event associated with the skill-based wagering game and randomly selects a skill event record associated with the skill event from a database. The controller receives a player's selection input from a user input device in response to the displayed skill event, determines a player skill level value based on the received player's selection, determines an award value included in the selected skill event record based on the player skill level value; and adjusts the credit balance based on the determined award value.

18 Claims, 23 Drawing Sheets

(51) Int. Cl.
*G06F 17/00* (2019.01)
*G07F 17/32* (2006.01)

(56) References Cited

U.S. PATENT DOCUMENTS

| | | | | |
|---|---|---|---|---|
| 2013/0131848 A1* | 5/2013 | Arnone | G07F 17/3244 | 700/91 |
| 2015/0348367 A1* | 12/2015 | Arnone | G07F 17/3244 | 463/26 |
| 2016/0125697 A1* | 5/2016 | Oberberger | G07F 17/3244 | 463/26 |

OTHER PUBLICATIONS

International Preliminary Report on Patentability (International Application No. PCT/US2017/049698) dated Mar. 12, 2019; 10 pages.

* cited by examiner

400

118/120

128 132 100/108 100/102 130 126

| Weight | Chip Color | Skill Level | | | |
|---|---|---|---|---|---|
| | | (PERFECT) Table #1 | (GREAT) Table #2 | (GOOD) Table #3 | (BAD) Table #4 |
| 30.00000% | Bule | 2 | 2 | 2 | 2 |
| 30.00000% | Bule | 10 | 9 | 9 | 8 |
| 15.00000% | Bule | 20 | 18 | 17 | 15 |
| 10.00000% | Blule | 30 | 27 | 26 | 23 |
| 9.49000% | Gold | 40 | 36 | 34 | 30 |
| 2.50000% | Gold | 50 | 45 | 43 | 38 |
| 1.50000% | Gold | 100 | 90 | 85 | 75 |
| 1.00000% | Gold | 250 | 225 | 213 | 188 |
| 0.50000% | Gold | 500 | 450 | 425 | 375 |
| 0.01000% | Gold | 1000 | 900 | 850 | 750 |

Figure 24

118/122

126

| Weight | Chip Color | Skill Level | | | |
|---|---|---|---|---|---|
| | | (PERFECT) Table #1 | (GREAT) Table #2 | (GOOD) Table #3 | (BAD) Table #4 |
| 42.3855% | Bule | 2 | 2 | 2 | 2 |
| 45.0000% | Bule | 10 | 9 | 9 | 8 |
| 7.0000% | Bule | 20 | 18 | 17 | 15 |
| 3.0000% | Blule | 30 | 27 | 26 | 23 |
| 1.6000% | Gold | 40 | 36 | 34 | 30 |
| 0.9145% | Gold | 50 | 45 | 43 | 38 |
| 0.0500% | Gold | 100 | 90 | 85 | 75 |
| 0.0250% | Gold | 250 | 225 | 213 | 188 |
| 0.0200% | Gold | 500 | 450 | 425 | 375 |
| 0.0050% | Gold | 1000 | 900 | 850 | 750 |

Figure 25

118/124

126

| Weight | Chip Color | Skill Level | | | |
|---|---|---|---|---|---|
| | | (PERFECT) Table #1 | (GREAT) Table #2 | (GOOD) Table #3 | (BAD) Table #4 |
| 60.000% | Bule | 2 | 2 | 2 | 2 |
| 32.400% | Bule | 10 | 9 | 9 | 8 |
| 5.000% | Bule | 20 | 18 | 17 | 15 |
| 1.000% | Blule | 30 | 27 | 26 | 23 |
| 1.000% | Gold | 40 | 36 | 34 | 30 |
| 0.500% | Gold | 50 | 45 | 43 | 38 |
| 0.050% | Gold | 100 | 90 | 85 | 75 |
| 0.025% | Gold | 250 | 225 | 213 | 188 |
| 0.020% | Gold | 500 | 450 | 425 | 375 |
| 0.005% | Gold | 1000 | 900 | 850 | 750 |

Figure 26

134

142 140 138

| Pattern # | RTP level | | | | RTP % | | | | Avg. | Weight |
|---|---|---|---|---|---|---|---|---|---|---|
| | Stage1 | Stage2 | Stage3 | Stage4 | Stage1 | Stage2 | Stage3 | Stage4 | | |
| 136 1 | Low | Low | Low | Middle | 74.0% | 74.0% | 74.0% | 97.6% | 79.9% | 32 |
| 2 | Low | Low | Middle | High | 74.0% | 74.0% | 97.6% | 220.0% | 116.4% | 8 |
| 3 | Middle | Low | Low | Middle | 97.6% | 74.0% | 74.0% | 97.6% | 85.8% | 32 |
| 136 4 | Low | Middle | Low | High | 74.0% | 97.6% | 74.0% | 220.0% | 116.4% | 8 |
| 5 | Middle | Middle | Low | Middle | 97.6% | 97.6% | 74.0% | 97.6% | 91.7% | 32 |
| 6 | Middle | Low | Middle | High | 97.6% | 74.0% | 97.6% | 220.0% | 122.3% | 4 |
| 7 | Low | Middle | Middle | High | 74.0% | 97.6% | 97.6% | 220.0% | 122.3% | 4 |
| 8 | Middle | Middle | Middle | High | 97.6% | 97.6% | 97.6% | 220.0% | 128.2% | 4 |
| 9 | Low | Low | Low | High | 74.0% | 74.0% | 74.0% | 220.0% | 110.5% | 16 |
| 10 | Low | Middle | High | High | 74.0% | 97.6% | 220.0% | 220.0% | 152.9% | 2 |

Figure 27

144/150

148 100

146

| Game Score | Skill Level |
| --- | --- |
| more than 10000 | PERFECT (Table #1) |
| 7500 to 10000 | GREAT (Table #2) |
| 2500 to 7500 | GOOD (Table #3) |
| less than 2500 | BAD (Table #4) |

Figure 28

152

146

| Number of objects passed | Skill Level |
| --- | --- |
| 15 or more | PERFECT (Table #1) |
| 10 to 15 | GREAT (Table #2) |
| 5 to 10 | GOOD (Table #3) |
| less than 5 | BAD (Table #4) |

Figure 29

154

146

| LAP TIME | Skill Level |
| --- | --- |
| less than 00'01"00 | PERFECT (Table #1) |
| 00'01"00 to 00'01"30 | GREAT (Table #2) |
| 00'01"30 to 00'02"00 | GOOD (Table #3) |
| more than 00'02"00 | BAD (Table #4) |

Figure 30

156

146

| Direction | Length | Skill Level |
|---|---|---|
| GOOD | GOOD | PERFECT (Table #1) |
| GOOD | BAD | GREAT (Table #2) |
| BAD | GOOD | GOOD (Table #3) |
| BAD | BAD | BAD (Table #4) |

Figure 31

156/158

146

| Number of strokes | Skill Level |
|---|---|
| -2 or less | PERFECT (Table #1) |
| -1 | GREAT (Table #2) |
| ±0 | GOOD (Table #3) |
| +1 or more | BAD (Table #4) |

Figure 32

160

146

| Caused Damage to Opponent | Skill Level |
|---|---|
| Extra Large (more than 60% of Stamina) | PERFECT (Table #1) |
| Lage (40% to 60% of Stamina) | GREAT (Table #2) |
| Midium (20% to 40% of Stamina) | GOOD (Table #3) |
| Small (less than 20% of Stamina) | BAD (Table #4) |

Figure 33

160

146

| Number of HIT COMBINATION | Skill Level |
|---|---|
| 10 or more | PERFECT (Table #1) |
| 5 to 10 | GREAT (Table #2) |
| 2 to 5 | GOOD (Table #3) |
| less than 2 | BAD (Table #4) |

Figure 34

160

146

| Remaining Stamina | Skill Level |
|---|---|
| 90% or more | PERFECT (Table #1) |
| 60% to 90% | GREAT (Table #2) |
| 40% to 60% | GOOD (Table #3) |
| less than 40% | BAD (Table #4) |

Figure 35

160

146

| Evaluation score | Skill Level |
|---|---|
| 500,000 or more | PERFECT (Table #1) |
| 300,000 to 500,000 | GREAT (Table #2) |
| 100,000 to 300,000 | GOOD (Table #3) |
| less than 100,000 | BAD (Table #4) |

Figure 36

GAMING MACHINE AND METHODS OF OPERATING GAMING MACHINES TO PROVIDE SKILL-BASED WAGERING GAMES TO PLAYERS

CROSS-REFERENCE TO RELATED APPLICATION

This application is a continuation of U.S. patent application Ser. No. 15/261,775, filed Sep. 9, 2016, the disclosure of which is hereby incorporated by reference in its entirety.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

TECHNICAL FIELD

The subject matter disclosed herein relates generally to gaming machines and more particularly, to gaming machines and methods for operating gaming machines to provide skill-based wagering games to players.

BACKGROUND OF THE INVENTION

Known gaming machines include a video display device to display a reel game that includes a plurality of reels with each reel including a plurality of symbols. During game play, the gaming machine accepts a wager from a player, the player selects one or more paylines, the gaming machine spins the reels, and sequentially stops each reel to display a combination of symbols on the reels. The gaming machine then awards the player an award based on the combination of symbols orientated along the selected payline. At least some known gaming machines may also include bonus feature games that may include additional free spins and/or progressive awards.

Overtime, players may become frustrated with known wagering game feature because the games have limited player interaction and affect on the game outcome. Accordingly, new features are necessary to appeal to player interest and enhance excitement in order to entice longer play and increased profitability. The present invention is directed to satisfying these needs.

SUMMARY OF THE INVENTION

In one aspect of the present invention, a gaming machine for providing a skill-based wagering game to a player is provided. The gaming machine includes a display device, a user input device, a database, and a controller including a processor. The user input device includes a player selection device, an accepting device, and a cashout device. The player selection device is configured to generate a signal indicating a player's selection input. The accepting device is configured to accept an item associated with a monetary value to establish a credit balance being increasable and decreasable based at least on wagering activity. The cashout device is configured to receive an input to cause an initiation of a payout associated with the credit balance. The database includes a plurality of award paytables. Each of the award paytables includes a plurality of skill event records. Each skill event record includes a corresponding selection probability and a plurality of award values. Each award value is associated with a corresponding skill level value. The controller is programmed to display a skill-based wagering game on the display device, receive a signal indicating a wager being received from the player, and initiate the skill-based wagering game. The controller generates and displays a skill event associated with the skill-based wagering game, and randomly selects a skill event record associated with the skill event. The controller then receives a player's selection input via the user input device in response to the displayed skill event, determines a player skill level value based on the received player's selection, and determines an award value included in the selected skill event record based on the player skill level value. The controller then adjusts the credit balance based on the determined award value.

In another aspect of the present invention, a computer-implemented method of operating a gaming machine, is provided. The gaming machine includes a display device, a user input device, and a controller. The method includes the controller displaying a skill-based wagering game on the display device, receiving, from the user input device, a signal indicating a wager being placed by the player, and adjusting a credit balance. The user input device includes a player selection device, an accepting device, and a cashout device. The player selection device is configured to generate a signal indicating a player's selection input. The accepting device is configured to accept an item associated with a monetary value to establish a credit balance being increasable and decreasable based at least on wagering activity. The cashout device is configured to receive an input to cause an initiation of a payout associated with the credit balance. The controller initiates the skill-based wagering game upon receiving the wager and accesses a database that includes a plurality of award paytables. Each of the award paytables includes a plurality of skill event records. Each skill event record includes a corresponding selection probability and a plurality of award values. Each award value is associated with a corresponding skill level value. The controller generates a skill event associated with the skill-based wagering game, randomly selects a skill event record associated with the skill event, and displays the skill event on the display device. The controller also receives a player's selection input via the user input device in response to the displayed skill event, determines a player skill level value based on the received player's selection, determines an award value included in the selected skill event record based on the player skill level value, and adjusts the credit balance based on the determined award value.

In yet another aspect of the present invention, one or more non-transitory computer-readable storage media, having computer-executable instructions embodied thereon, is provided. The computer-executable instructions cause a processor to display a skill-based wagering game on the display device, receive, from a user input device, a signal indicating a wager being placed by the player, and adjust a credit balance. The user input device includes a player selection device, an accepting device, and a cashout device. The player selection device is configured to generate a signal indicating a player's selection input. The accepting device is configured to accept an item associated with a monetary value to establish a credit balance being increasable and decreasable based at least on wagering activity. The cashout device is configured to receive an input to cause an initiation of a payout associated with the credit balance. The processor initiates the skill-based wagering game upon receiving the wager and accesses a database including a plurality of award paytables. Each of the award paytables includes a plurality of skill event records. Each skill event record includes a corresponding selection probability and a plurality of award values. Each award value is associated with a corresponding skill level value. The processor generates a skill event associated with the skill-based wagering game, randomly selects a skill event record associated with the skill event, and displays the skill event on the display device. The processor receives a player's selection input via the user input device in response to the displayed skill event, determines a player skill level value based on the received player's selection, determines an award value included in the selected skill event record based on the player skill level value, and adjusts the credit balance based on the determined award value.

BRIEF DESCRIPTION OF THE DRAWINGS

Other advantages of the present invention will be readily appreciated as the same becomes better understood by reference to the following detailed description when considered in connection with the accompanying drawings wherein:

FIGS. 24-36 are exemplary illustrations of data records that may be used by the gaming machine shown in FIG. 1, according to an embodiment of the present invention.

Corresponding reference characters indicate corresponding parts throughout the drawings.

DETAILED DESCRIPTION OF THE PREFERRED EMBODIMENT

Figure 1:
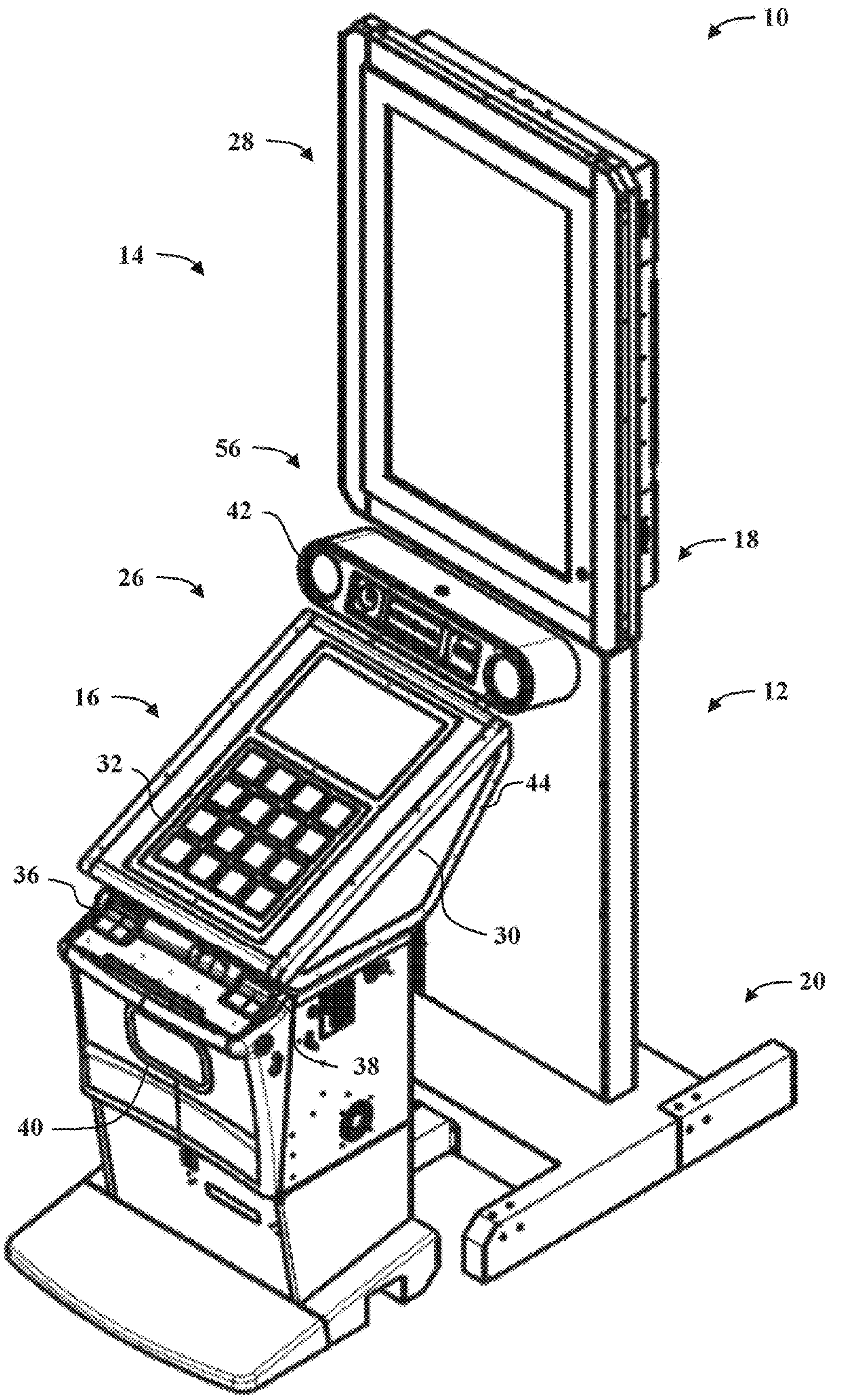
FIG. 1 is a perspective view of an exemplary gaming machine for use in providing a skill-based wagering game to a player, according to an embodiment of the present invention.
Figure 2:
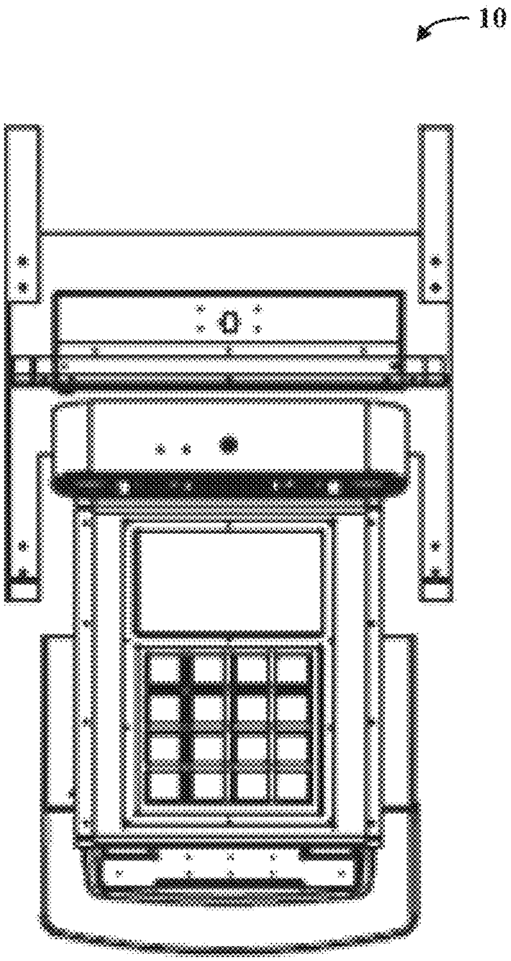
FIG. 2 is a top view of the gaming machine shown in FIG. 1.
Figure 3:
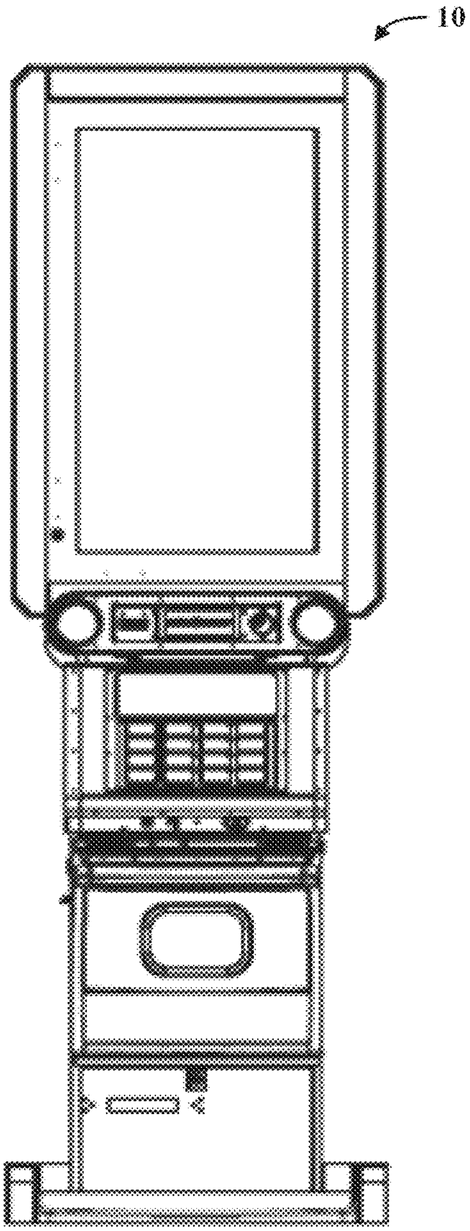
FIG. 3 is a front view of the gaming machine shown in FIG. 1.
Figure 4:
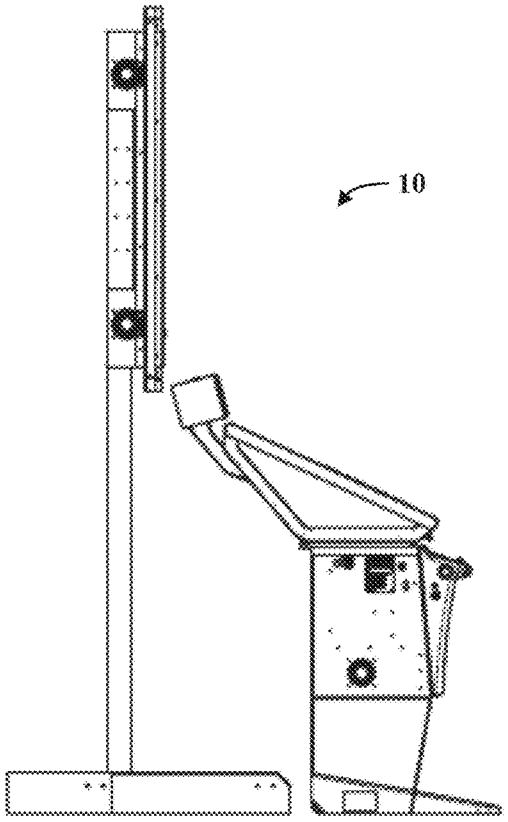
FIG. 4 is a side view of the gaming machine shown in FIG. 1.
Figure 5:
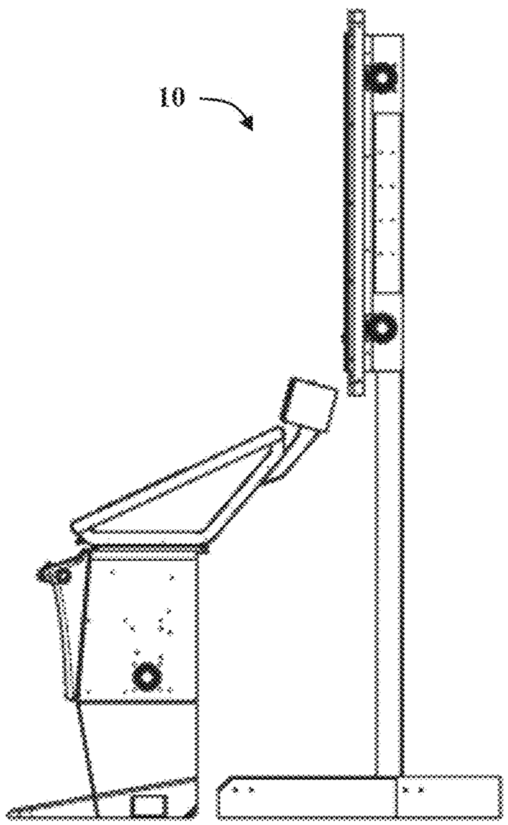
FIG. 5 is another side view of the gaming machine shown in FIG. 1.

With reference to the drawings and in operation, the present invention overcomes at least some of the disadvantages of known gaming systems by providing a gaming machine that provides a skill-based wagering game that allows the player to place wagers and receive awards based on the player's skill in performing skill-based events.

The gaming machine provides a game of skill which pays an award to a player of the game based on the player's skill. The skill-based wagering game may include a wide range of skill games for a casino, such as for example, wagering music games, shooting games, racing games, fighting games, sports games and the like.

In one embodiment, the skill-based wagering game may include a musical skill game with game play similar to a Whac-A-Mole™ type game. For example, in one embodiment, the skill-based wagering game may include a game similar to Jubeat™, published by Konami Ltd. Animated explosions or other animations, called "markers", that can be chosen at the song select screen are shown within the panels synced to a track of the player's choosing. When the markers reach a "hot point", which is dependent on the marker chosen, the player must tap the corresponding screen to score points. Taps can be judged as either Perfect, Good, Fast, or Slow. The skill-based wagering game may also include three difficulty settings (Basic, Advanced, and Extreme) for each song. The gaming machine may also track and save statistics and a player ranking, which may be used to access unlockable songs.

The gaming machine determines a skill level of the player and changes an award determination table based on the determined skill level of the player. For a low-skill player, the gaming machine may use an award determination table which assures minimum return to player (RTP) percentage to the player. For a high-skill player, the gaming machine may use a different award determination table which provide more chance for a larger award. By providing different award determination tables based on skill levels, the gaming machine a) assures the minimum RTP (%) for low-level skill players and b) provides a chance to win high prize for high-level skill players concurrently. As used herein, the term "Return to Player" describes a value indicating an amount of wagered funds that will be returned to players over a predefined period of time. For example, instance, a gaming machine having an RTP of 95% is expected to return $95 out of every $100 put in over a predefined period of time.

In addition, the gaming machine may provide the skill-based wagering game including a plurality of game stages. The gaming machine game defines a RTP (%) level of each game stage separately, which allows the player can enjoy a non-monotonic game with varied RTP. This may be used in skill-based music games as well as free games of a conventional slot machine.

In addition, when operated to initiate a game of skill in which a monetary award is paid a player of the game based on the player's skill, the gaming machine may provide a $1^{st}$ game phase in a practice mode without consuming credit before providing a $2^{nd}$ game phase in an wagering game mode. Thus allowing the player to be familiar with gameplay before betting money. In addition, the gaming machine can measure the skill level of the player in the $1^{st}$ phase and provide appropriate difficulty in the $2^{nd}$ phase.

A selected embodiment of the present invention will now be explained with reference to the drawings. It will be apparent to those skilled in the art from this disclosure that the following description of the embodiment of the present invention is provided for illustration only and not for the purpose of limiting the invention as defined by the appended claims and their equivalents.

FIG. 1 is a perspective view of an exemplary gaming machine 10 for providing a skill-based wagering game to a player, according to an embodiment of the present invention. FIGS. 2-6 are various views of the gaming machine 10 shown in FIG. 1. FIG. 7 is a functional block diagram of the gaming machine 10. In the illustrated embodiment, the gaming machine 10 includes a gaming controller 12, a display device 14 for displaying a plurality of games, and a user input device 16 to enable a player to interface with the gaming machine 10. The gaming controller 12 is operatively coupled to the display device 14 and the user input device 16 to enable a player to play games being displayed on the display device 14. In one embodiment, the gaming machine 10 may include a gaming machine installed in a casino. In another embodiment, the gaming machine 10 may include a personal computer, laptop, cell phone, smartphone, tablet computer, personal data assistant, and/or any suitable computing device.

In the illustrated embodiment, the gaming machine 10 also includes a cabinet assembly 18 that is configured to support the display device 14, the user input device 16, and/or the gaming controller 12 from a gaming stand 20 and/or a supporting surface. The display device 14 and the user input device 16 are each coupled to the cabinet assembly 18 and are each accessible by the player. In one embodiment, the gaming controller 12 is positioned within the cabinet assembly 18. Alternatively, the gaming controller 12 may be separated from the cabinet assembly 18, and connected to components of the gaming machine 10 through a network such as, for example, a LAN, a WAN, dial-in-connections, cable modems, wireless modems, and/or special high-speed ISDN lines. For example, in one embodiment, the gaming controller 12 may be located remotely with respect to the gaming machine 10, or within one of the gaming machine cabinet assembly 18.

In the illustrated embodiment, the display device 14 is configured to display a skill-based wagering game 22 on a game screen 24 (shown in FIGS. 12-16) including computer-generated graphic images for use in the skill-based wagering game 22, for example, sequential images used in a musical arcade games such as the Jubeat™ published by Konami, Ltd., role playing video arcade such as Castlevania™, Metal Gear Solid™, and Contra™ published by Konami, Ltd., shooting games such as Gradius™ published by Konami, Ltd., vehicle arcade racing games such as Road Fighters™, published by Konami, Ltd., and/or sports related arcade games such as Pro Evolution Soccer™ published by Konami, Ltd. In addition, the skill-based wagering game 22 may include any type of game including, but not limited to, a role-playing game, a puzzle game, a maze-type game, a video slot game, a keno game, a blackjack game, a video poker game, or any type of game which allows a player to make a wager, play a game, and potentially provide the player an award based on an outcome of the game and a paytable.

In the illustrated embodiment, the display device 14 may include a first display 26 and a second display 28. In one embodiment, the display device 14 may be configured to display the skill-based wagering game on the first display 26 and display a secondary wagering game on the second display 28. For example, the secondary wagering game may include a video slot game described in U.S. patent application Ser. No. 14/855,993 to Gilmore et al., filed Sep. 16, 2015, titled "Gaming Machine and Methods of Providing Games to Players Having Player Characters and Enemy Characters", which is incorporated herein by reference in its entirety. Moreover, in one embodiment, each display 26 and 28 may be configured to display at least a portion of the game screen 24. In addition, the display device 14 may be configured to display the game screen 24 on the first display 26 and/or the second display 28.

In one embodiment, the first display 26, and/or the second display 28 may include a flat panel display, such as a cathode ray tube display (CRT), a liquid crystal display (LCD), a light-emitting diode display (LED), an organic light-emitting diode display (OLED), an active-matrix organic light-emitting diode display (AMOLED), a plasma display, and/or any suitable visual output device capable of displaying graphical data and/or text to a user. Alternatively, a single component, such as a touch screen, may function as both the display device 14 and as the user input device 16. In the illustrated embodiment, the gaming machine 10 also includes a pair of side display units 30 that are used to display various images associated with the skill-based wagering game.

The user input device 16 includes a player selection device 32 including a touch button unit 34 for receiving a player's selection, a coin slot 36, and/or a bill acceptor 38. The coin slot 36 includes an opening that is configured to receive coins and/or tokens deposited by the player into the gaming machine 10. The gaming controller 12 converts a value of the coins and/or tokens to a corresponding amount of gaming credits that are used by the player to wager on games played on the gaming machine 10. In one embodiment, the user input device 16 may include an acceptor device which accepts media associated with a monetary value to establish a credit balance, a validator device configured to identify physical media, and a cash-out button actuatable to cause an initiation of a payout associated with the credit balance. In one embodiment, the acceptor device may be configured to receive physical media such as, for example, a coin, a medal, a ticket, a card, a bill, currency, and/or any suitable physical media that enables the gaming machine 10 to function as described herein. The acceptor device may also be configured to accept virtual media such as, for example, an RFID signal, a keypad and/or touch screen entry, a personal identification number and/or identifier, a player tracking account, a virtual credit balance, reward points, gaming credits, bonus points, and/or any suitable virtual media that enables the gaming machine 10 to function as described herein. For example, in one embodiment, the coin slot may include an opening that is configured to receive coins and/or tokens deposited by the player into the gaming machine 10. In one embodiment, the acceptor device may include the coin slot 36 and/or the bill acceptor 38.

The bill acceptor 38 includes an input and output device that is configured to accept a bill, a ticket, and/or a cash card into the bill acceptor 38 to enable an amount of gaming credits associated with a monetary value of the bills, ticket, and/or cash card to be credited to the gaming machine 10. The bill acceptor 38 may also include the validator device to identify bills, ticket, and/or cash card received by the gaming machine. Moreover, the gaming machine 10 may also utilize a cashless wagering system (not shown), such as a ticket in ticket out (TITO) system (not shown). In one embodiment, the bill acceptor 38 also includes a printer (not shown) that is configured to dispense a printed voucher ticket that includes information indicative of an amount of credits and/or money paid out to the player by the gaming machine 10 during a gaming session. The voucher ticket may be used at other gaming machines, or redeemed for cash, and/or other items as part of a casino cashless system (not shown). In one embodiment, the acceptor device and/or the validator device may include the coin slot 36, the bill acceptor 38, a TITO system, a cashless wagering system, and/or a player tracking device.

A coin hopper 40 is coupled to the cabinet assembly 18 and is configured to receive a plurality of coins that are dispensed from the gaming machine 10. One or more speakers 42 are installed inside the cabinet assembly 18 to generate voice announcements and/or sound effects associated with game play. The gaming machine 10 also includes one or more illumination lighting devices 44 that are configured to blink and/or change brightness and color in specific patterns to produce lighting effects to enhance a visual gaming experience for the player.

The touch button unit 34 includes a plurality of transparent touch buttons 46 that are positioned over a portion of the first display 26. In the illustrated embodiment, the touch button unit 34 includes sixteen touch buttons 46 arranged in a 4×4 grid arrangement. The touch buttons 46 allow images being displayed on the first display 26 to be viewable by a player through the touch buttons 46. In one embodiment, each of the touch buttons 46 is coupled to a corresponding mechanical switch that is configured to detect a player's operation of the touch button 46 and transmit a signal indicating the operation of the touch button 46 to the gaming controller 12. For example, as shown in FIG. 12-16, the gaming controller 12 may operate the first display 26 to display the game screen 24 including a plurality of graphic operational images 48 that may be used by the player to operate the gaming machine 10. Each of the operational images 48 may be visible by the player through a corresponding transparent touch button 46. When a corresponding touch button 46 is actuated by the player, e.g. depressed by the player, a corresponding mechanical switch transmits a signal indicated the actuation of the touch button 46 to the gaming controller 12. The gaming controller 12 then executes the operation associated with the displayed operational image 48 actuated by the player.

In one embodiment, the touch buttons 46 may include a plurality of BET switches 50 for inputting a wager on a game and initiating the game and a PAYOUT switch 52 (shown in FIG. 13) for ending a gaming session and dispensing accumulated gaming credits to the player. In another embodiment, the user input device 16 may include a video touch display that displays video images of the touch buttons 46. The user input device 16 may also include a touchless display being displayed with changeable video images of the touch buttons.

The gaming machine 10 also includes a player tracking device 56 that is coupled to the gaming controller 12 for identifying the player and/or a player tracking account that is associated with the player. The player tracking account may include, but is not limited to, gaming credits available to the player for use in playing the gaming machine 10. The player tracking device 56 is configured to communicate player account information between a player tracking controller (not shown) and the gaming machine 10. For example, the player tracking device 56 may be used to track bonus points and/or credits awarded to the player during a gaming session and/or track bonus and/or credits downloaded to the gaming machine 10 from the player tracking system. In the illustrated embodiment, the player tracking controller assigns a player status, e.g. a player ranking, based on the player account information. For example, the player tracking information may include, but is not limited to, a frequency in which the player plays a game, the average wager the player makes per play of a game, a total amount wagered by the player over a predefined period of time, and/or any other suitable player tracking information.

The player tracking device 56 is coupled to the gaming cabinet assembly 18 and includes a player identification card reader, a data display, and a keypad. The player identification card reader is configured to accept a player tracking card (not shown) inserted by the player, and read information contained on the player tracking card to identify the player account information. The player identification card reader may include, but is not limited to, a barcode reader, a magnetic card reader, IC card reader, and/or a radio frequency identification (RFID) card reader. The keypad is configured to accept a user selection input such as, for example, a unique player personal identification number (PIN) to facilitate enabling the gaming machine 10 to identify the player, and access player account information associated with the identified player to be displayed on the data display. In one embodiment, the data display includes a touchscreen panel that includes the keypad. Alternatively, the data display and the keypad may be included in the display device 14.

Figure 6:
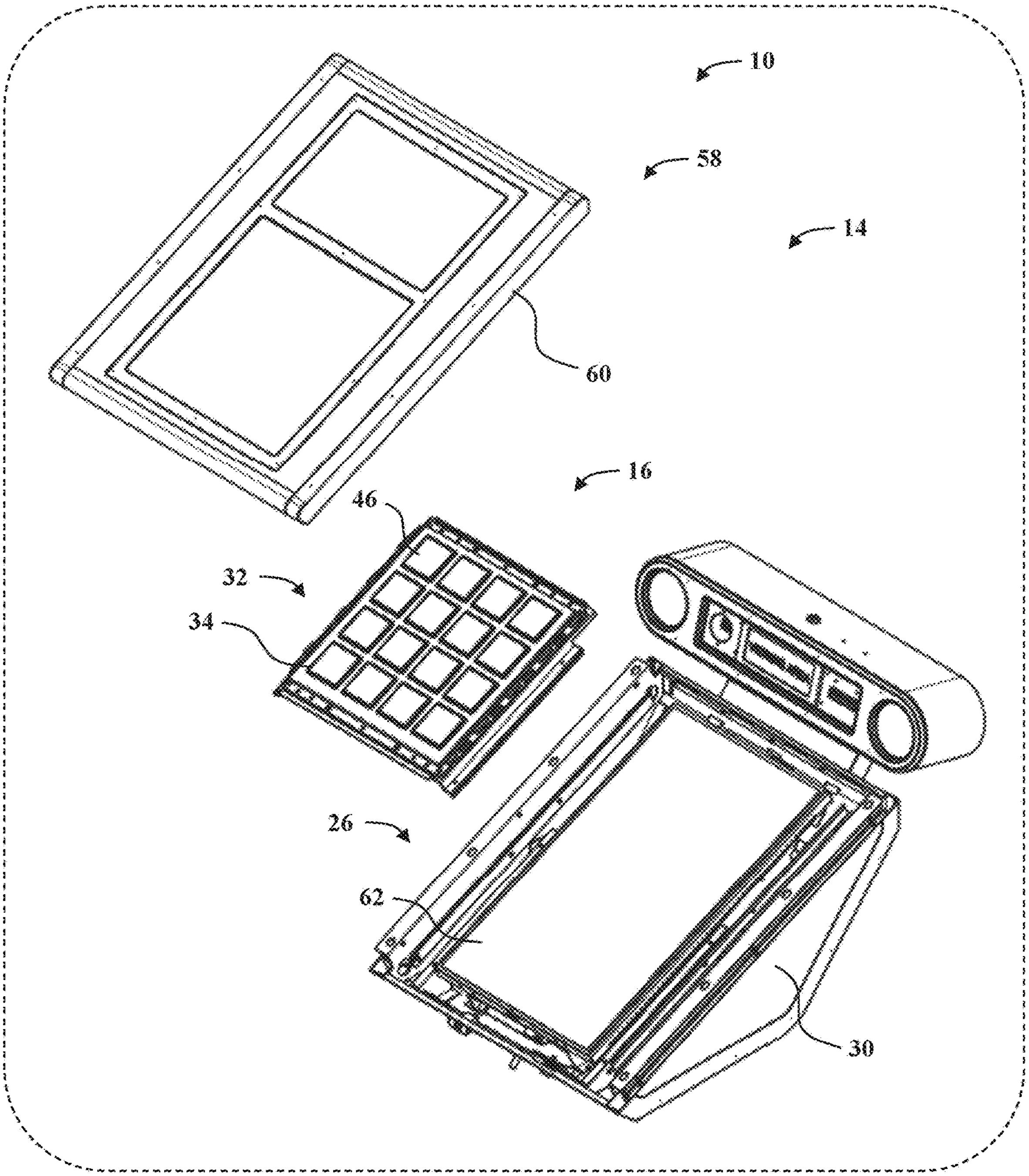
FIG. 6 is an exploded schematic view of the gaming machine shown in FIG. 1.
Figure 7:
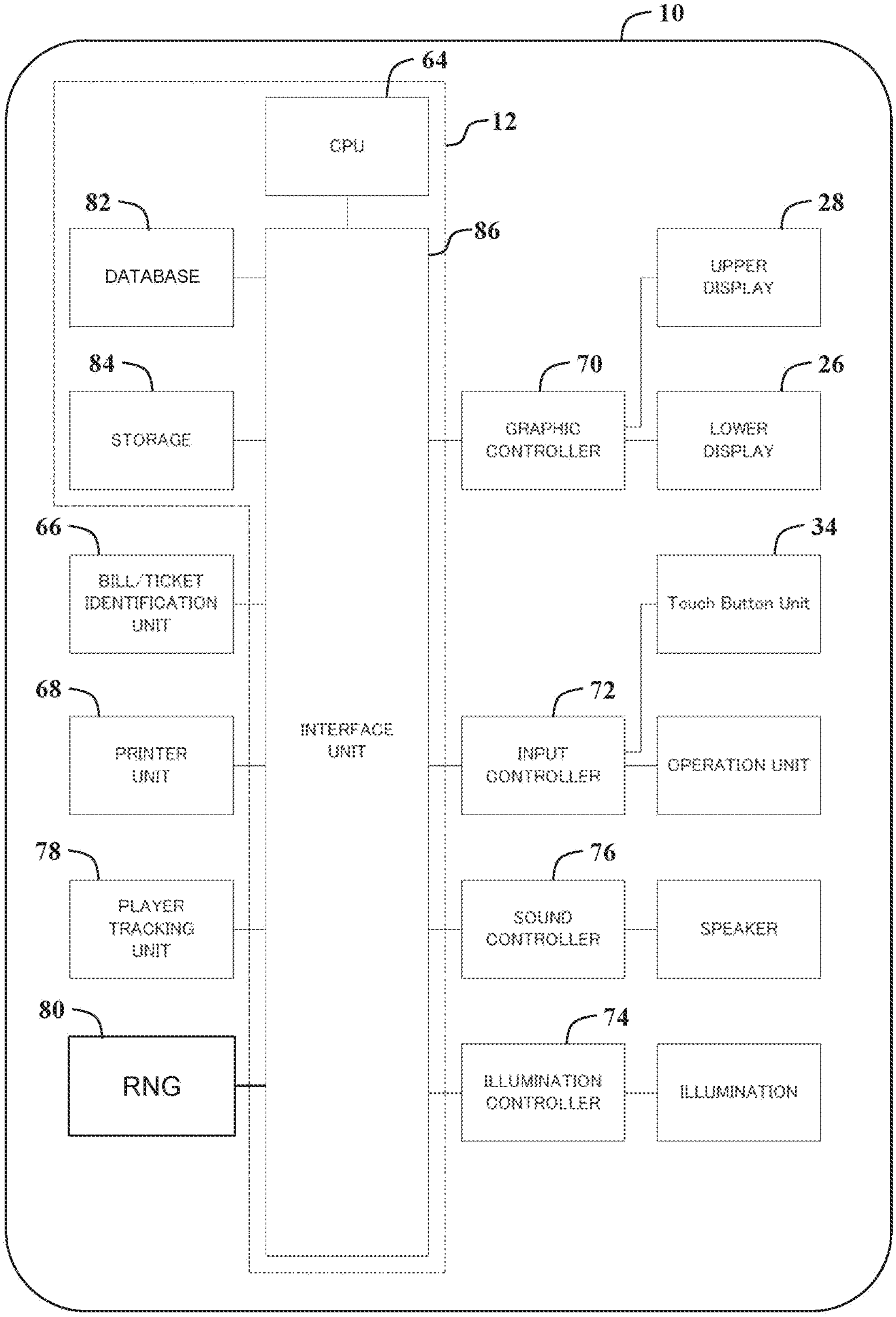
FIG. 7 is a functional block diagram of the gaming machine shown in FIG. 1, according to an embodiment of the present invention.

Referring to FIG. 6, in one embodiment the gaming machine 10 includes a top unit 58 that includes a cover unit 60, the touch button unit 34 and an LCD unit 62. In addition 2 side LED units are provided at the both sides of top unit. The touch button unit has 4×4 transparent buttons which accept player's touch operation respectively. Due to its transparency, the player can see graphical images displayed on LCD unit through the transparent buttons. When the player touches (depresses) the transparent button, mechanical switches incorporated below the transparent button detect the player's operation and send signal to the control unit. The side LED unit perform illumination by changing brightness and/or color tone of LEDs inside of it.

Referring to FIG. 7, in one embodiment, the gaming machine 10 may include the gaming controller 12, a bill/ ticket identification unit 66, a printer unit 68, a graphic controller 70, an input controller 72, an illumination controller 74, a sound controller 76, a player tracking unit 78, and a random-number generator (RNG) 80. The gaming controller 12 includes a processor, i.e., a central processing unit (CPU) 64, a memory device 82, a database 84, and an interface unit 86. The interface unit 86 is configure to transmit signals and data between the CPU 64 and the bill/ticket identification unit 66, the printer unit 68, the graphic controller 70, the input controller 72, the illumination controller 74, the sound controller 76, the player tracking unit 78, the RNG 80, the memory device 82, and the database 84 to enable the gaming controller 12 to operate the gaming machine 10 to provide the skill-based wagering game 22 as described herein.

The memory device 82 includes a computer readable medium, such as, without limitation, random access memory (RAM), read-only memory (ROM), erasable programmable read-only memory (EPROM), flash memory, a hard disk drive, a solid state drive, a diskette, a flash drive, a compact disc, a digital video disc, and/or any suitable device that enables the gaming controller 12 to store, retrieve, and/or execute instructions and/or data.

The CPU 64 executes various programs, and thereby the gaming controller 12 controls other components of the gaming machine 10 according to player instructions and data accepted by the user input device 16. The CPU 64 in particular executes a game program, and thereby conducts a game in accordance with the embodiments described herein. The memory device 82 stores programs and databases used by the CPU 64. Moreover, the memory device 82 stores and retrieves information in the database 84 including, but not limited to, wagers, wager amounts, skill-based game events, and image data for producing game images and/or screens on the display device 14, and temporarily stores variables, parameters, and the like that are used by the CPU 64. In addition, the memory device 82 stores indicia, game images, operating timing data, and/or award paytables which represent relationships between combinations of random numbers, types of awards, and player skill level values. In one embodiment, the memory device 82 utilizes RAM to temporarily store programs and data necessary for the progress of the game, and EPROM to store, in advance, programs and data for controlling basic operation of the gaming machine 10, such as the booting operation thereof.

The bill/ticket identification unit 66 manages the amount of player's credits, which is equivalent to the amount of coins and bills counted and validated by the bill acceptor 38. The bill/ticket identification unit 66 may also convert a player's credits to coins, bills, or other monetary data by using the coin hopper 40 and/or for use in dispensing a credit voucher via the bill acceptor 38. The printer unit 68 is configured to operate the printer included with the bill acceptor 38 to print ticket vouchers used with a cashless wagering system.

The graphic controller 70 controls the display device 14 to display various images on a graphical interface including the game screen 24 preferably by using computer graphics and image data stored in the memory device 82. More specifically, the graphic controller 70 generates and displays the images being displayed with the game including images being displayed on the first display device 14 and the second display device 14 by using computer graphics and the image data.

The input controller 72 monitors player selections received through the user input device 16, accepts various instructions and data that a player enters through the user input device 16, and transmits signals indicative of player's selections to the gaming controller 12.

The illumination controller 74 controls one or more illumination devices 44 to blink and/or change brightness and color in specific patterns in order to produce lighting effects associated with game play. The sound controller 76 controls the speakers 42 to output voice announcements and sound effects during game play.

The player tracking unit 78 operates the player tracking device 56 to allow the player to identify the player and/or a player tracking account that is associated with the player.

The RNG 80 generates and outputs random numbers to the gaming controller 12 for use in generating and displaying the skill-based wagering game 22. The RNG 80 outputs random numbers preferably at the start of each round of a game. The gaming controller 12 uses the random numbers to determine an outcome of the games. For example, the gaming controller 12 uses the RNG 80 to randomly select award paytables that may be used during the skill-base game to provide awards to the player based on the level of skill demonstrated by the players during the game. Moreover, the gaming controller 12 generally uses random numbers generated by the RNG 80 to play the games and to determine whether or not to provide an award to a player. The gaming controller 12 may also receive combinations of random numbers from the RNG 80 for use during the skill-based game. In general, the term "award" may be a payout, in terms of credits or money. Thus, the gaming controller 12 may award a regular payout in response to the outcome of the game. However, it should be noted that the term award may also refer to other types of awards, including, prizes, e.g., meals, show tickets, etc . . . , as well as in-game award, such as bonus features, free games, and/or free spins, or awarding the player one or more wild symbols or stacked wild symbols in each of the games. The RNG 80 may be implemented as a hardware module or a software module executed by the CPU 64.

In the illustrated embodiment, the gaming controller 12 includes a skill-based game program for use in executing the skill-based wagering game 22 being displayed on the display device 14. In the illustrated embodiment, the skill-based wagering game 22 includes one or more skill events that must be completed by the player. The gaming controller 12 is programmed to determine a skill level of the player based on the player's selections being made during the skill event, and determine an award to be provided to the player based on the determined skill level. In some embodiments, the skill-based game may include any game that allows the player to affect the outcome of the skill-based game through a series of player choices and/or player selections. The skill-based game may also include a player skill component associated with the player's selection that may include physical or manual dexterity, digital dexterity, hand-eye coordination (e.g., aim), reflexes, memory, cognitive processing, knowledge, and/or strategy-based selection. Skill-based games may include, but are not limited to including, role-playing arcade-type games, first-person shooting games, sporting games, memory games, matching games, and/or any suitable game that includes a skill component and that enables the outcome of the game to be at least partially determined based on a players selection.

For example, with reference to FIGS. 12-23, in the illustrated embodiment, the skill-based wagering game 22 includes a musical skill game that includes a plurality of skill events associated with the timing of a musical soundtrack, such as for example, Jubeat™ published by Konami, Ltd. The gaming controller 12 is programmed to play the musical soundtrack and display a plurality of skill events in coordination with the musical soundtrack. For example, in the illustrated embodiment, each skill event includes an image being displayed within a touch button 46 at a predefined time during the musical soundtrack. The player is prompted to actuate or depress the corresponding touch button 46 during the period in which the image is being displayed in order to register a player input. The gaming controller 12 then evaluates the timing in which the player input was received with respect to the time period in which the image was being displayed, and determines a skill level associated with the skill event based on the timing of the player input. During the skill-based wagering game 22, the gaming controller 12 may display a plurality of skill events as the musical soundtrack is being played, and determine an award to be provided to the player based on the player input associated with each skill event.

Figure 17:
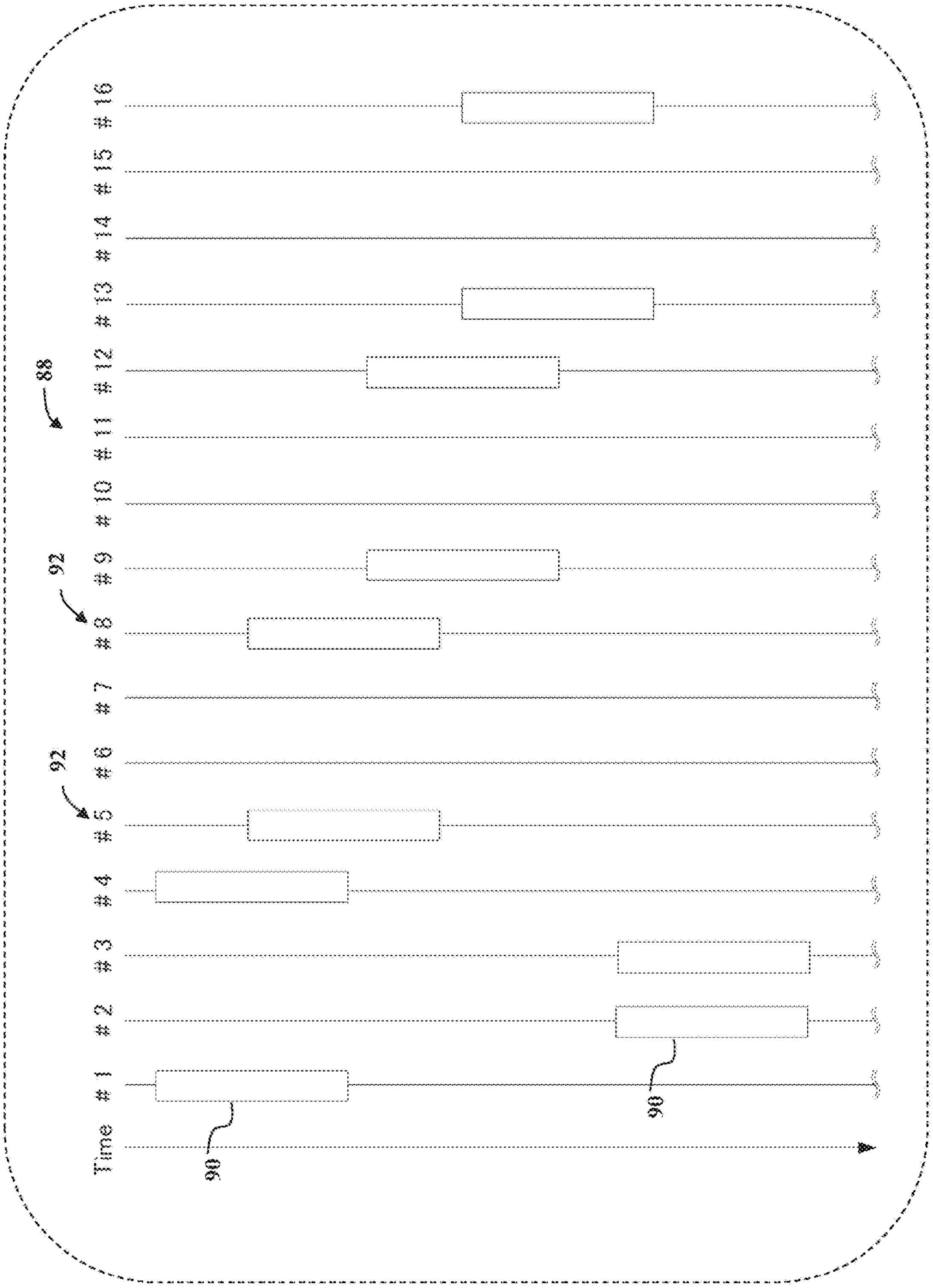
FIG. 17 is an schematic illustration of timing chart that may be used by the gaming machine shown in FIG. 1 to display a skill-based wagering game, according to an embodiment of the present invention.
Figure 18:
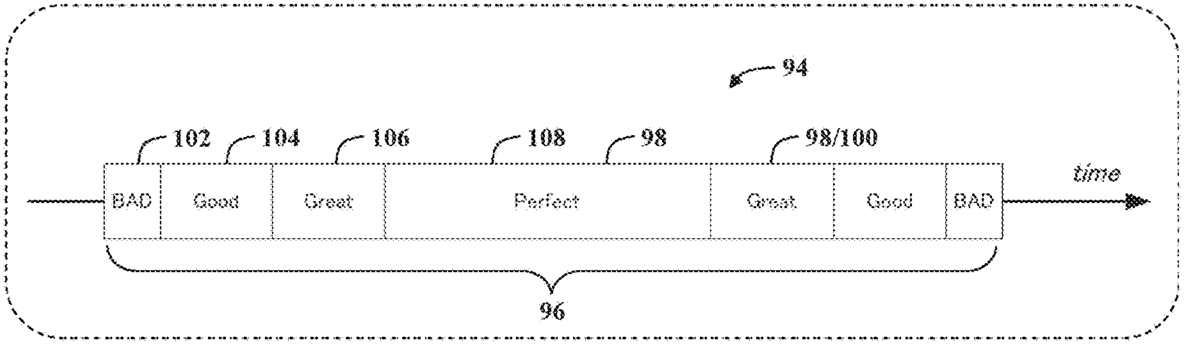
FIG. 18 is an exemplary event timing period that may be used by the gaming machine shown in FIG. 1 to display a skill-based wagering game, according to an embodiment of the present invention.

The database 84 includes a plurality of data records that may be used by the gaming controller 12 to operate the gaming machine 10 to generate and display the skill-based wagering game 22. For example, as shown in FIG. 17, in one embodiment, the database 84 may include a plurality of timing chart data records 88 that includes a plurality of skill events 90 that occur over a predefined period of time. The timing and position to display the marker is defined as shown in this timing chart. Each music title has its corresponding timing chart. In the illustrated embodiment, each timing chart data record 88 includes a timing record 92 associated with each of the touch buttons 46 included in the touch button unit 34. For example, as shown in FIG. 17, the timing chart data record 88 includes sixteen timing records 92 corresponding with each of the sixteen touch buttons 46. Each timing record 92 includes data associated with the appearance of a skill event at a corresponding touch button 46 during the predefined time period. In the illustrated embodiment, the appearance of a skill event 90 is coordinated with a beat of the music soundtrack to prompt the player to actuate the corresponding touch button 46 with the corresponding music beat. As shown in the timing chart data record, multiple skill events 90 may appear simultaneously and at different touch buttons 46.

In addition, multiple skill events 90 may also appear sequentially and at the same and/or different touch buttons 46. For example, a skill-based wagering game 22 being executed using the illustrated timing chart data record 88 would include a pair of skill events first appearing with touch button No. 1 and touch button No. 4, followed by the appearance of skill events in touch button No. 5 and touch button No. 8. In one embodiment, the database 84 may also include data associated with a variety of musical soundtracks that may be used with the skill-based wagering game 22. The database may also include one or more timing chart data records 88 that are associated with each of the musical soundtracks.

The database 84 also includes a plurality of operation timing records 94 (shown in FIG. 18) that may be used to determine a skill level of a player during the skill event. The operation timing record 94 illustrates a relationship between the player's operation timing and the player's skill level on each touch. Each operation timing record 94 includes an event time period 96 that includes a predefined period of time. The event time period 96 includes a plurality of consecutive operation timing periods 98. Each operation timing period 98 is associated with a player skill level value 100 and may be used to determine a skill level associated with the player's execution of the corresponding skill event. The determined player skill level may then be used to determine an award being provided to the player. In the illustrated embodiment, the event time period 96 includes operation timing periods 98 associated with four different skill level values including a low skill level value 102 (illustrated as "Bad"), a medium skill level value 104 (illustrated as "Good"), a medium-high skill level value 106 (illustrated as "Great"), and a high skill level value 108 (illustrated as "Perfect").

Figure 23:
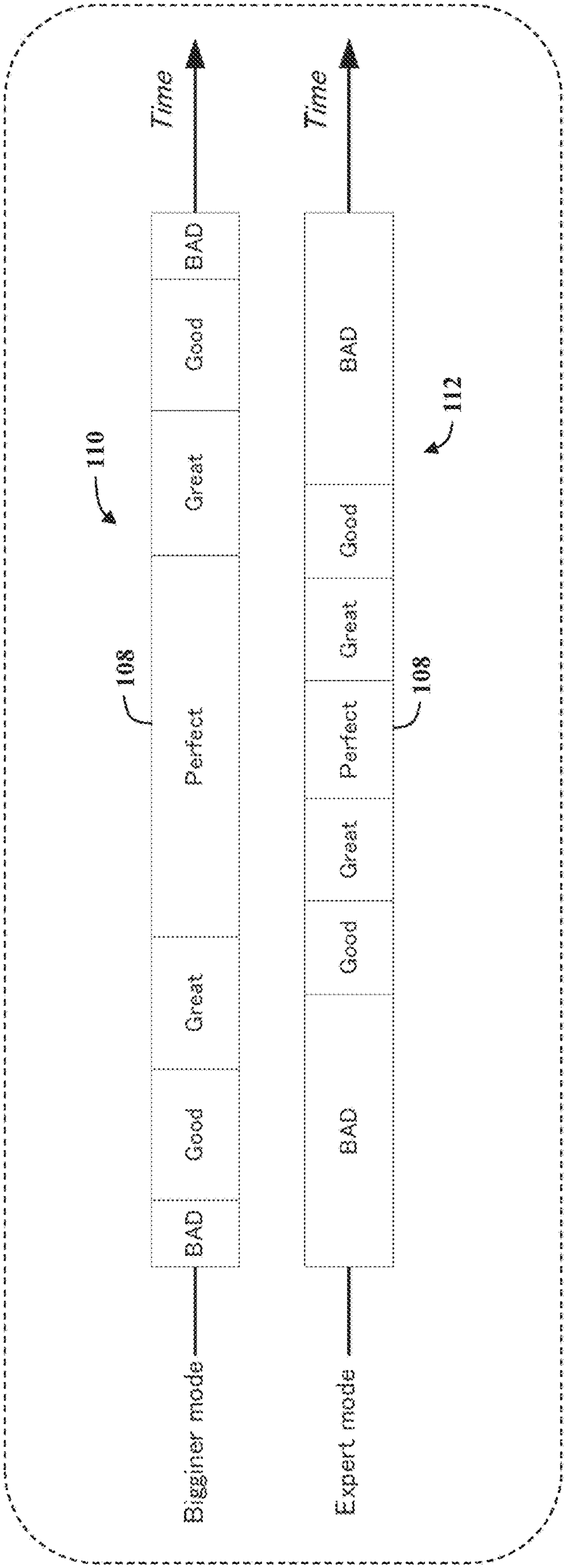
FIG. 23 are exemplary event timing periods that may be used by the gaming machine shown in FIG. 1 to display a skill-based wagering game, according to an embodiment of the present invention.

In one embodiment, as shown in FIG. 23, the database 84 may include a low skill operation timing record 110 and a high skill operation timing record 112. The low skill operation timing record 110 includes a high skill operation timing period 108 that is longer in time than the high skill operation time period 108 included with the high skill operation timing record 112.

Figure 19:
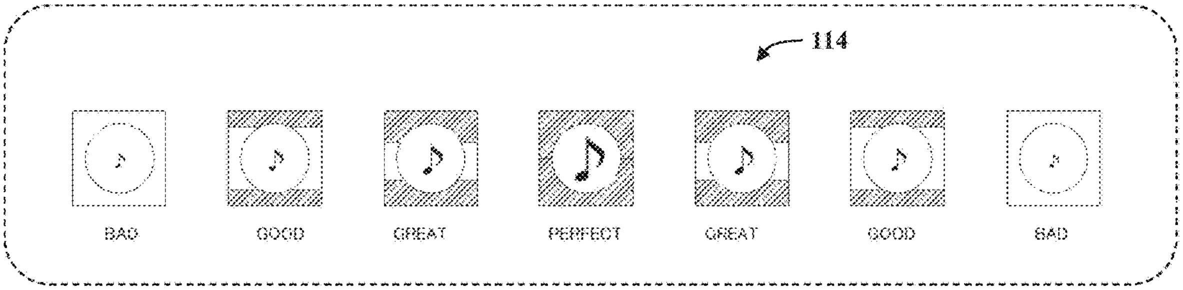
FIG. 19 is an illustration of a sequence of graphic images that may be used by the gaming machine shown in FIG. 1 to display a skill-based wagering game, according to an embodiment of the present invention.
Figure 20:
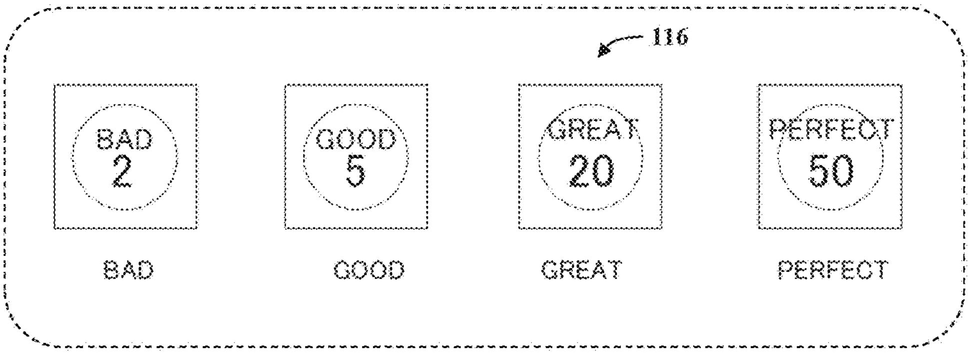
FIG. 20 is an illustration of various graphic images that may be used by the gaming machine shown in FIG. 1 to display a skill-based wagering game, according to an embodiment of the present invention.
Figure 21:
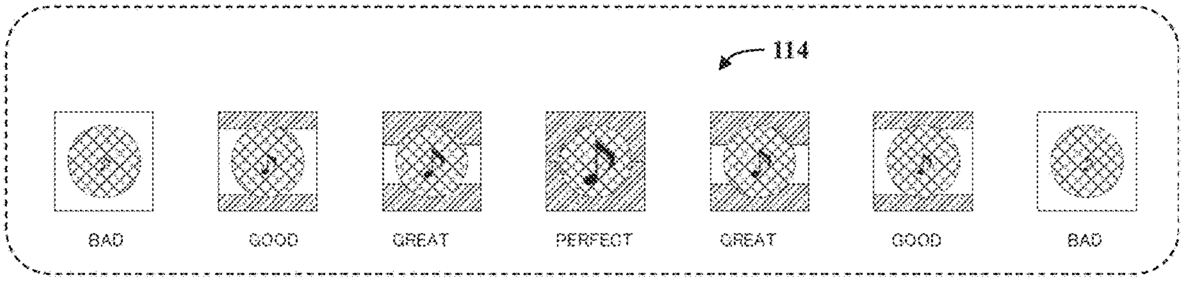
FIG. 21 is another illustration of a sequence of graphic images that may be used by the gaming machine shown in FIG. 1 to display a skill-based wagering game, according to an embodiment of the present invention.

In addition, with reference to FIGS. 19 and 21, in one embodiment, the database 84 may also include a sequential image record 114 that includes a plurality of images that may be used to display the skill event 90 with a corresponding touch button 46. FIG. 19 illustrates an animation of a marker. The size of a note increases in the first half and reduces in the second half. In other words, the size of the note changes according to skill level at that timing. In addition, colored zone in the back ground of the notes also increases and reduces like as the size of the note. FIGS. 19 and 20 corresponds to a marker with blue chip color in the award paytables shown in FIG. 25-27. FIG. 21 illustrates an alternative animation of a marker and corresponds to a marker with gold chip color in the award paytables shown in FIG. 25-27. For example, the sequential image record 114 may include a graphic image corresponding to each operation timing period 98 included in the operation timing record 94. In addition, the sequential image record 114 includes images associated with each player skill level value 100 included in the operation timing record 94.

During play of the skill-based wagering game 22, the gaming controller 12 may display a skill event 90 including sequentially displaying the images included in the sequential image record 114 with a corresponding touch button 46 in accordance with the corresponding timing record 92 associated with the touch button 46. The sequential display of images prompts the player to actuate the corresponding touch button 46 as the images are being displayed. Upon receiving a signal from the touch button unit 34 indicating the player's actuation of the touch button 46, the gaming controller 12 detect a player's operation timing associated with the player's selection input and determines a corresponding consecutive operation timing period 98 associated with the player's operation timing. The gaming controller 12 may then determine a skill level value 100 based on the corresponding consecutive operation timing period. For example, if the player actuates the touch button early or late in the event time period sequence, the gaming controller 12 assigns a low skill level value 102, e.g. a Bad skill level, to the player. If the player actuates the touch button 46 in the middle of the event time period sequence, the gaming controller 12 assigns a high skill level value 108, e.g. a Perfect skill level, to the player.

Figure 22:
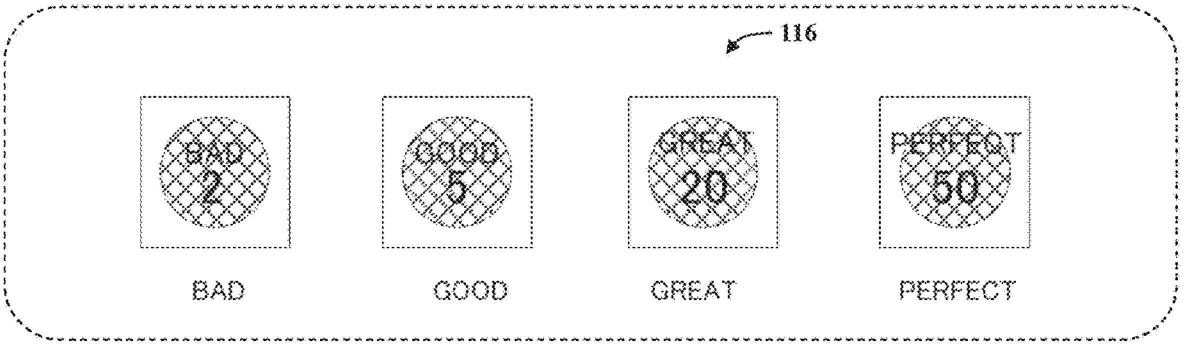
FIG. 22 is another illustration of various graphic images that may be used by the gaming machine shown in FIG. 1 to display a skill-based wagering game, according to an embodiment of the present invention.

In one embodiment, as shown in FIGS. 20 and 22, the database 84 includes a plurality of award images 116 that are used to display an award associated with the completion of a skill event. FIG. 20 illustrates an indication of the player's skill and earned credit on the marker of FIG. 19. FIG. 22 illustrates an indication of the player's skill and earned credit on the marker of FIG. 21. For example, during operation, upon determining the skill level value associated with the player's operation timing, the gaming controller 12 may determine an award associated with the skill level value, select a corresponding award image 116, and display the award image 116 within the touch button 46 to notify the player of the received award.

In the illustrated embodiment, with reference to FIGS. 23-26, the database 84 also includes a plurality of award paytables 118 that may be used to execute the skill-based wagering game 22. In one embodiment, the database 84 may include a first award paytable 120 that has a low return to player (RPT) value, a second award paytable 122 having a medium RPT value, and a third award paytable 124 having a high RPT value. For example, in one embodiment, as shown in FIG. 27, the first award paytable 120 may have a low RTP equal to 74%, the second award paytable 122 may have a medium RPT value equal to 97.6%, and the third award paytable may have a high RPT value equal to 220%.

Each award paytable 118 includes plurality of skill event records 126. Each skill event record 126 includes a corresponding selection probability 128 and a plurality of award values 130. The selection probability 128 indicates the probability of the corresponding skill event record 126 being selected from the plurality of skill event records 126 based on random number selection. Each award value 130 is associated with a corresponding skill level value 100. In addition, each skill event record 126 may include a range of skill level values 100 including associated award values 130. For example, as shown in FIG. 23, each skill event record 126 may include a low award value associated with a low skill level value 102, a medium award value associated with a medium skill level value 104, a medium-high award value associate with a medium-high skill level value 106, and a high award value associated with a high skill level value 108. In addition, the award paytable 118 may include a skill event record that includes the same award values for each of the skill level values, and a skill event record that includes a different award value for each skill level. In addition, each skill event record 126 may include a different selection probability 128. FIG. 23 illustrates another embodiment which has a beginner mode game and an expert mode game. Different relationships between the player's operation timing and the player's skill level on each touch are provided to the beginner mode game and the expert mode game. In the expert mode game, it is more difficult to achieve a high skill level than in the beginner mode.

Each skill event record 126 may include event image data 132 that includes information associated with the images being displayed with the skill event. For example, as shown in FIG. 23, the award paytable 118 includes a first skill event record 126 having a first event image data and a second skill event record 126 having a second event image data. The first event image data includes a first sequential image record and first award images shown in FIGS. 19 and 20, respectively. The second event image data includes a second sequential image record and second award images shown in FIGS. 21 and 22, respectively.

During operation, the gaming controller 12 is programmed to select an award paytable 118 for use during the skill-based wagering game 22, and randomly select an event record 126 for each skill event 90 that is included in the skill-based wagering game 22. For example, in one embodiment, the gaming controller 12 is programmed to initiate the skill-based wagering game 22 including accessing the database 84 and selecting the timing chart data record 88 and determine a number of skill events 90 to be displayed with the skill-based wagering game 22. The gaming controller 12 is programmed to select an award paytable 118 from the plurality of paytables 11 and randomly select a skill event record 126 for each of the skill events 90. In one embodiment, the gaming controller 12 may randomly select the same skill event record 126 for more than one skill event 90. The gaming controller 12 may also select an operation timing record 94 associated with each skill event 90. The gaming controller 12 then accesses the corresponding skill event record 126 to determine the event image data associated with the skill event 90 and display the skill event 90 including the corresponding event image data in accordance with the timing chart data record 88.

During play of the skill-based wagering game, the gaming controller 12 detects the player's operation timing associated with the player's actuation of the corresponding touch button 46, determines a corresponding consecutive operation timing period 98 associated with the player's operation timing, and determines a skill level value 100 based on the corresponding consecutive operation timing period. The gaming controller 12 then accesses the corresponding skill event record 126, determines an award value 130 associated with the determined skill level 100, accesses the award images to determine the award image associated with the award value 130, and displays the selected award image with the touch button 46. The award image is displayed for a predefined period of time to notify the player of the award prior to displaying another skill event 90 with the corresponding touch button 46. At the conclusion of the skill-based wagering game 22, the gaming controller 12 calculates a total award value based on each award value received from the skill events 90 and adjusts the credit balance to include the total award value.

In one embodiment, the database 84 may also include a transition table 134 that includes a plurality of award pattern records 136. Each award pattern record 136 includes a pattern selection probability 138 and a plurality of paytable values 140. The pattern selection probability 138 indicates the probability of the corresponding award pattern record 136 being selected from the plurality of award pattern records 136 based on random number selection. Each paytable value 140 indicates a corresponding award paytable 118. For example, the paytable values 140 may indicate a paytable RTP value and include a low RTP value corresponding to the first award paytable 120 (shown in FIG. 23), a medium RTP value corresponding to the second award paytable 122 (shown in FIG. 24), and a high RTP value corresponding to the third award paytable 124 (shown in FIG. 25). In addition, each award pattern record 136 includes a plurality of stages 142. Each stage 142 includes a corresponding paytable value 140 and an associated number of consecutive skill events 90.

For example, during operation of the skill-based wagering game 22, the gaming controller 12 may be programmed to display a plurality of consecutive skill events 90 in consecutive stages 142. The gaming controller 12 is programmed to access the transition table 134 and to randomly select an award pattern record 136 from the transition table 134 and initiate the skill based game using the selected award pattern record 136. As shown in FIG. 27, each award pattern record 136 may include four stages 142 including Stage 1, Stage 2, Stage 3, and Stage 4. Each stage 142 may include a different number of skill events 90 or the same number of skill events 90. For example, Stage 1 may include 10 consecutive skill events 90 and Stage 2 may include 15 consecutive skill events 90. In addition, in one embodiment, each stage 142 may indicate a different type of skill event 90.

During play of the skill-based wagering game 22, for each skill event 90 being displayed, the gaming controller 12 may access the identify a current skill event stage 142 associated with a current skill event 90 being displayed and determine the award paytable 118 associated with the current skill event 90 based on the current skill event stage 142 and the selected award pattern record 136. As the player progresses through the various stages of the skill-based wagering game 22 the paytables being used to provide awards to the player for the completion of the skill events 90 will change based on the award pattern included in the selected award pattern record 136

In one embodiment, referring to FIGS. 28-36, in one embodiment, the database 84 may include a plurality of skill level tables 144 that may be used to determine a skill level value 100 associated with the skill-based wagering game 22. Each skill level table 144 includes a plurality of skill level records 146. Each skill level record 146 includes a game value 148 and a corresponding skill level value 100. The various skill level tables 144 enable to gaming controller 12 to provide a variety of types of skill-based wagering games having different types of skill events, and to determine a skill value 100 associated with each skill event type.

For example, in one embodiment, the gaming controller 12 may be programmed to provide a shooting type game such as, for example, Gradius 2™ published by Konami Ltd. This type of skill-based wagering game requires the player to control a player character and shoot targets in order to proceed through missions. During the missions, a predetermined game score is provided and accumulated when the player shoots and destroys the targets. In addition, bonus scores might be provided to the player based on elapsed time of the mission, extermination of a group of the targets or elimination of a specific target such as a boss character. In another embodiment, the skill-based wagering game 22 may include a role-playing action game such as Metal Gear Solid 4™, published by Konami Ltd. In this type game, the player controls a character and conducts various types of activities in order to proceed through missions. After completion of a mission, activities and achievements of the character is evaluated and corresponding game score is provided to the player. In these games, it is possible to classify the player's skill level based on the game score which the player earned through his game. For example, the database 84 may include a shooting game skill level table 150 (shown in FIG. 28) that includes a skill level records 146 including a game score associated with each skill level value 100.

In another embodiment, the skill-based wagering game 22 may include a racing game such as Road Fighters™, published by Konami Ltd. In this type game, the player controls a car by operating simulated steering, accelerator, brake and/or gearshift to drive the car through a race in the game screen. As a result of the race, predetermined game score is provided to the player based on ranking order and/or recorded time. In addition, bonus score might be provided based on ranking order and/or recorded time of each lap. Moreover, a plurality of virtual objects for showing the most suitable racing line might be allocated on race course.

In these games, it is possible to classify player's skill level based on the number of objects which the car has passed through the game, or to classify player's skill level based on the player's lap time and/or total record time during the whole race. For example, the database 84 may include a racing game skill level table 152 (shown in FIG. 29) that includes skill level records 146 including a number of objects passed associated with each skill level value 100. In addition, as shown in FIG. 30, the racing game skill level table 154 may also include skill level records 146 including an elapsed lap time associated with each skill level value 100.

In another embodiment, the skill-based wagering game 22 may include a sports themed game such as a golf game. In this type game, the player controls a character to play a sports game such as golf, tennis baseball or basketball and the like. As a result of the game, predetermined game score is provided to the player based on his victory/defeat, game score or point spread. In addition, bonus score might be provided based on the character's activity or achievement in the sports game. For example, during a golf game classification of the player's skill level may be based on the direction and the length of each shot in the golf game. For example, the database 84 may include a sports game skill level table 156 (shown in FIG. 31) that includes skill level records 146 including a direction and length of shots associated with each skill level value 100. In another example a classification of the player's skill level based on number of strokes at each hole in the golf game. The skill level may be classified after each hole out. The same classification method might be applicable to a stroke play with a series of holes in the golf game. Moreover, bonus award might be provided when the player achieved a special play such as a hole in one. For example, the database 84 may include a golf game skill level table 158 (shown in FIG. 32) that includes skill level records 146 including a number of strokes required to complete a hole associated with each skill level value 100.

In another embodiment, the skill-based wagering game 22 may include a fighting-type game such as Castlevania Judgment™, published by Konami Ltd. In this type game, a player controls a character and engages in a close combat with an opponent character. During the game, upon player's input to attack the opponent, success/failure of the attack and caused damage are calculated and a stamina meter of the opponent is reduced by a successful attack of the player. On the contrary, a stamina meter of the player is reduced by a successful attack of the opponent. In addition, when the player achieves sequential input correctly and timely, several attacks are chained together. This is known as "combos". Further, some of the fighting game evaluate activities and achievements of the character and corresponding game score is provided to the player. The classification of the player's skill level may be based on caused damage to the opponent in the fighting game. In this example, the skill level is determined each time the player character successfully attacks the opponent. For example, as shown in FIG. 33, the database 84 may include a fighting game skill level table 160 that includes skill level records 146 including an opponent damage value associated with each skill level value.

As shown in FIG. 34, the classification of the player's skill level based on number of combos in the fighting game. In this example, skill level is determined each time the player achieves 2 or more combo. The fighting game skill level table 160 may include skill level records 146 including a hit combination value associated with each skill level value 100.

In another embodiment, the classification of the player's skill level based on a remaining stamina when the player win the fighting game. In this example, skill level is determined after the player wins the fighting game. If the fighting game evaluates activities and achievements of the character and provides corresponding game score, it is possible to classify the player's skill level based on such a game score. For example, as shown in FIG. 35, the fighting game skill level table 160 may include skill level records 146 including a stamina value associated with each skill level value 100.

In addition, the fighting game also has an aspect as a game of engaging in contests of accuracy and speed on inputting a series of commands such as "↓+↓+↑+↑+A+A+B+B" and the like which triggers some special attack. Focusing on this aspect of the fighting game, it is possible to design a bonus skill game as follows: 1) displaying a game screen with a character and an opponent; 2. accepting a series of commands which triggers a special attack of the player; 3) evaluating difficulty, speed and accuracy of the commands; 4) classifying the player's skill level based on the evaluation; and 5) randomly determine an award of the bonus game. In addition, it is possible to classify player's skill based on input speed of a predetermined series of commands simply. For example, as shown in FIG. 36, the fighting game skill level table 160 may include skill level records 146 including an evaluation score associated with each skill level value.

Figure 8:
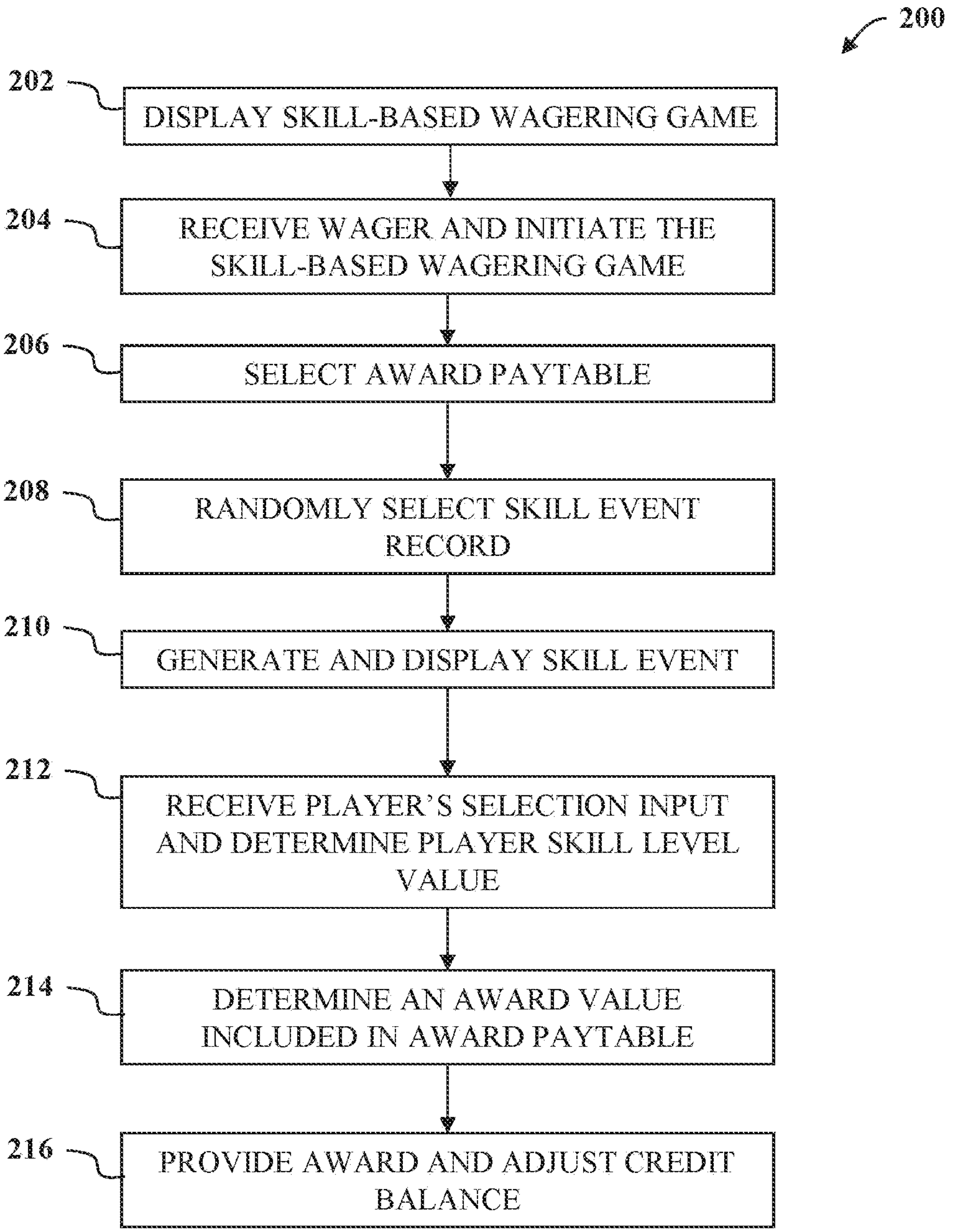
FIG. 8 is a flowchart of a method that may be used with the gaming machine shown in FIG. 1 for providing a skill-based wagering game to a player, according to an embodiment of the present invention.
Figure 9:
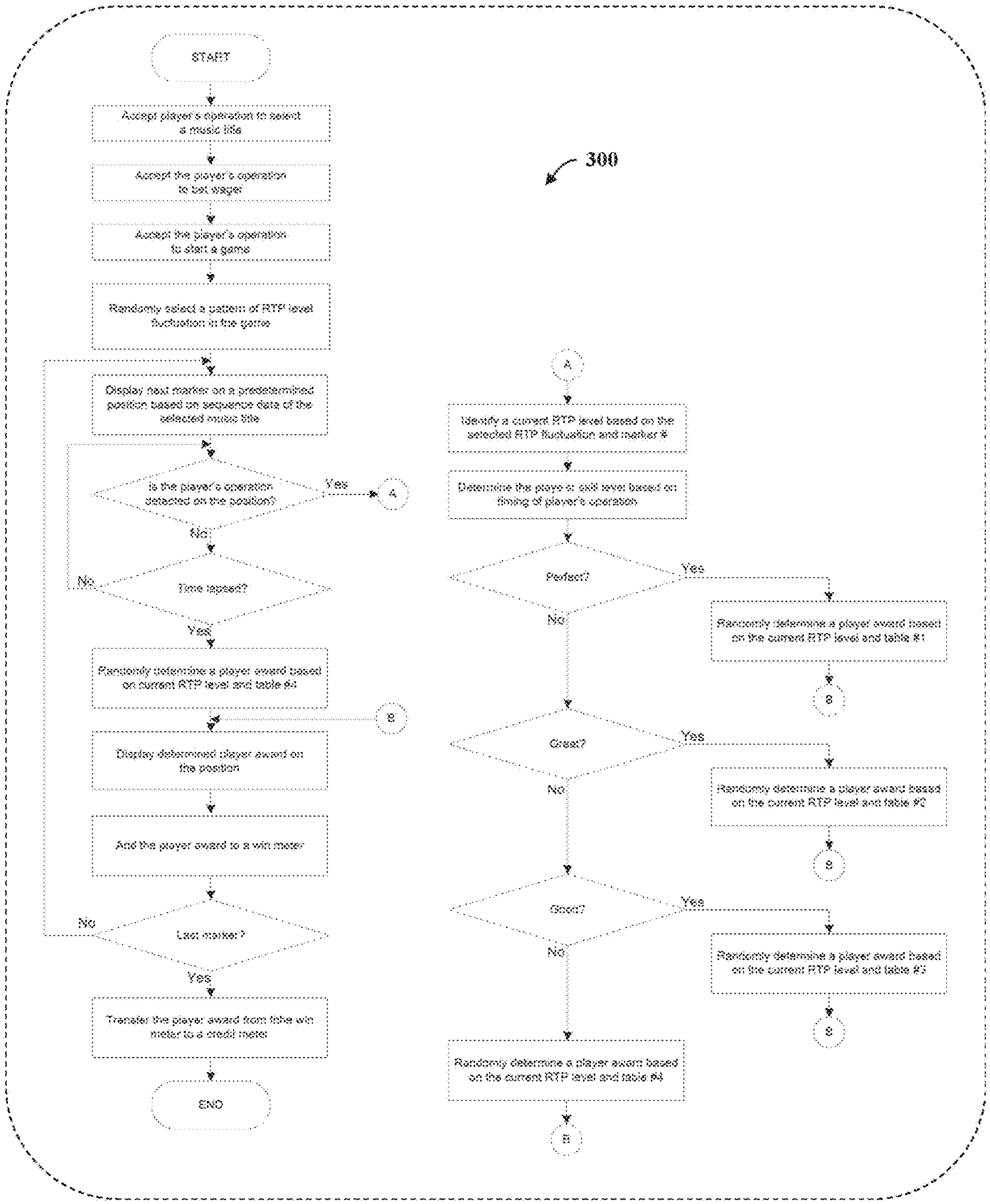
FIGS. 9-11 are flowcharts of methods that may be used with the gaming machine shown in FIG. 1 for providing a game to a player, according to an embodiment of the present invention.
Figure 10:
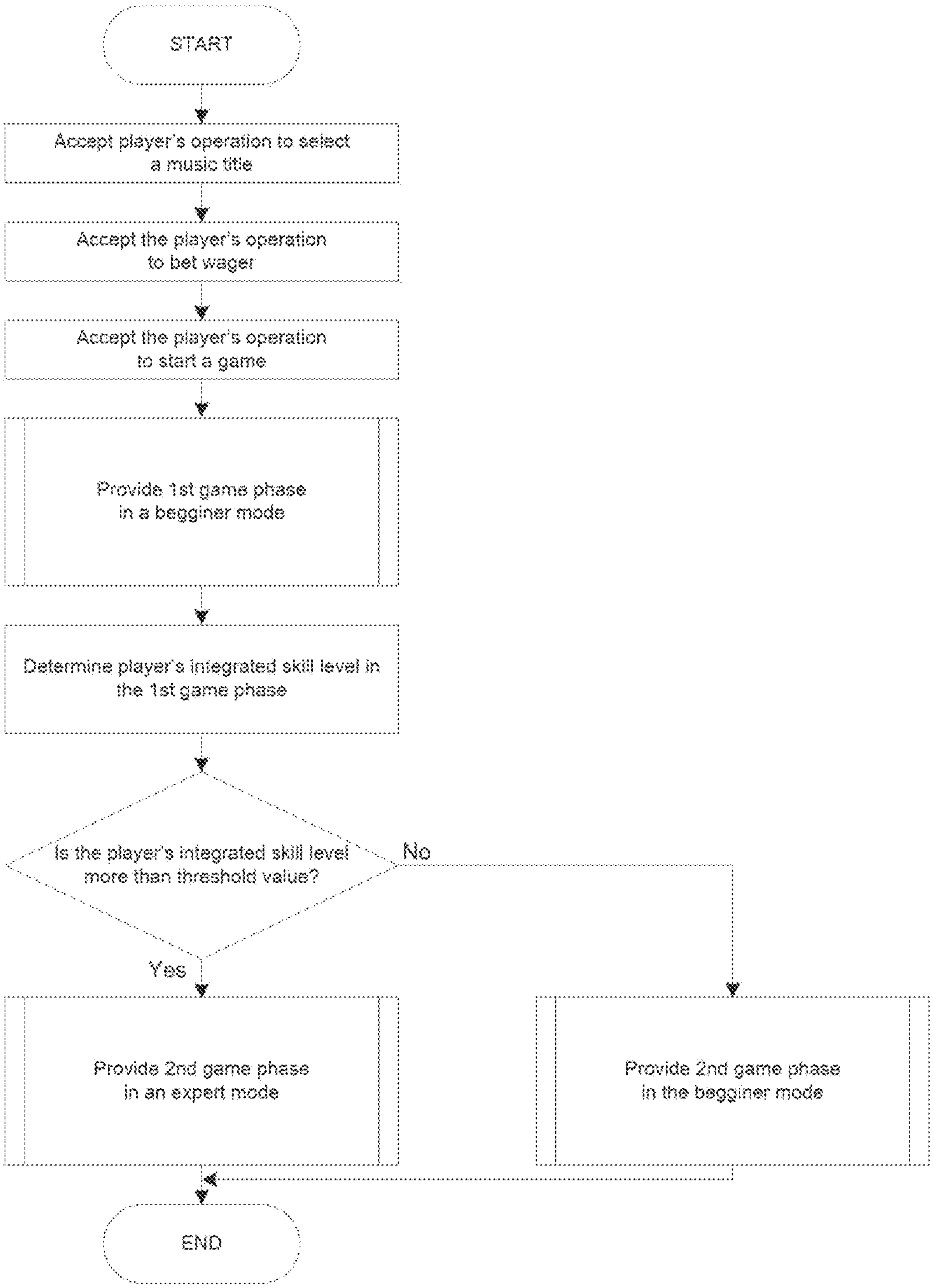
Figure 11:
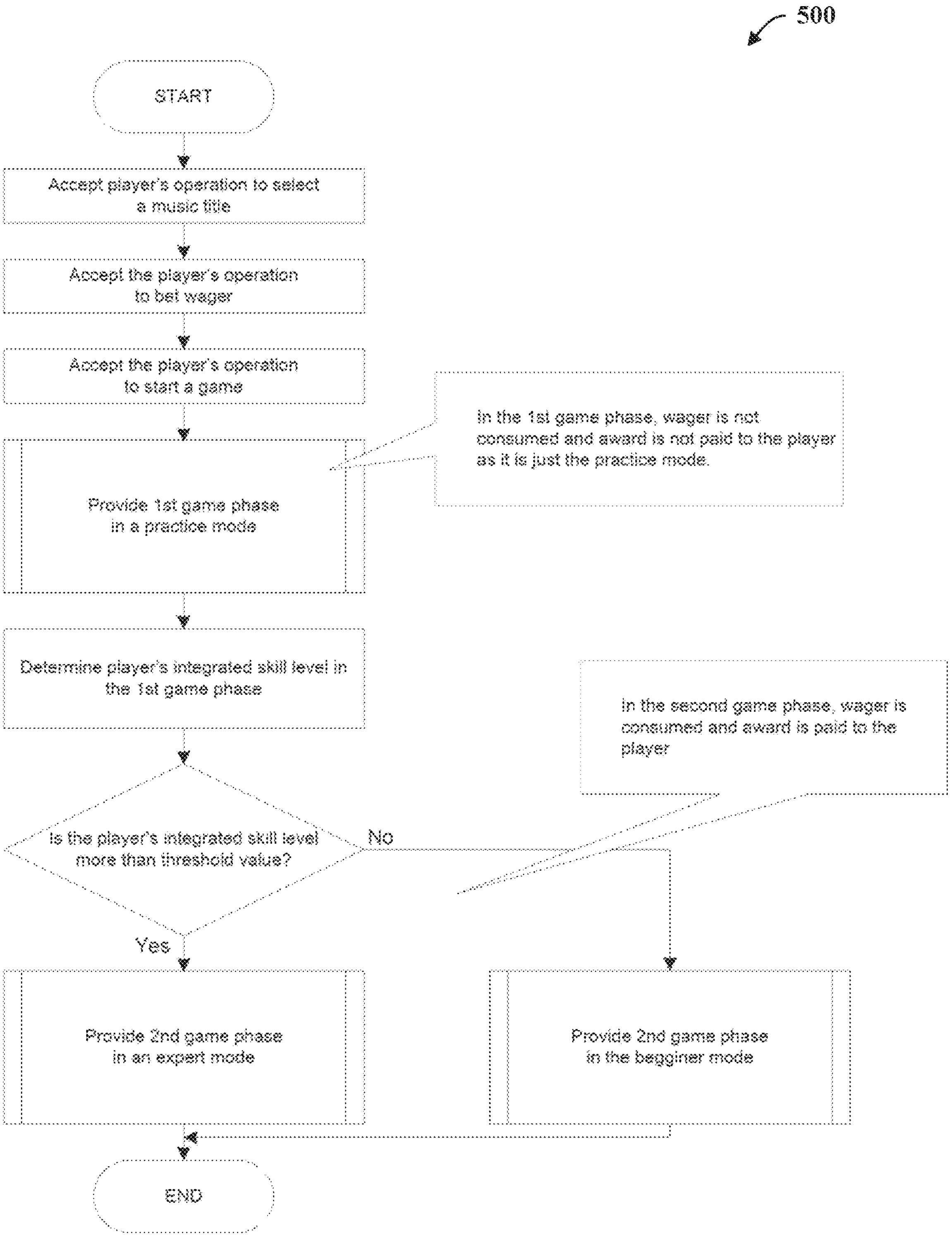

FIG. 8 is a flowchart of a method 200 that may be used to operate the gaming machine 10 to provide a skill-based wagering game to a player. FIGS. 9-11 flowcharts of additional methods 300, 400, and 500 that may be used to operate the gaming machine 10 to provide skill-based wagering games to players. The methods 200, 300, 400, and 500 include a plurality of steps. Each method step may be performed independently of, or in combination with, other method steps. Portions of the methods may be performed by any one of, or any combination of, the components of the one or more gaming machines 10. FIGS. 12-16 are exemplary entertaining graphical displays of a skill-based wagering game that may be played with the gaming machine 10.

In the illustrated embodiment, in method step 202, the gaming controller 12 displays the skill-based wagering game 22 on the display device 14. In one embodiment, the gaming controller 12 displays the skill-based wagering game 22 including a musical skill game that includes a plurality of skill events associated with the timing of a musical soundtrack, such as for example, Jubeat™ published by Konami, Ltd. In the illustrated embodiment, the gaming controller 12 displays the game screen 24 on the first display 26 including an information section 162 and a game section 164. The touch button unit 34 is positioned over the game section 164 and the gaming controller 12 is configured to display a plurality of graphic operational images 48 visible by the player through a corresponding transparent touch button 46. Each of the operational images 48 indicates an operation that may be performed by the gaming controller 12 when a corresponding touch button 46 is actuated by the player, e.g. depressed by the player. The information section 162 is used to display various information related to the operation of the gaming machine 10 and/or play of the skill-based wagering game 22.

Figure 12:
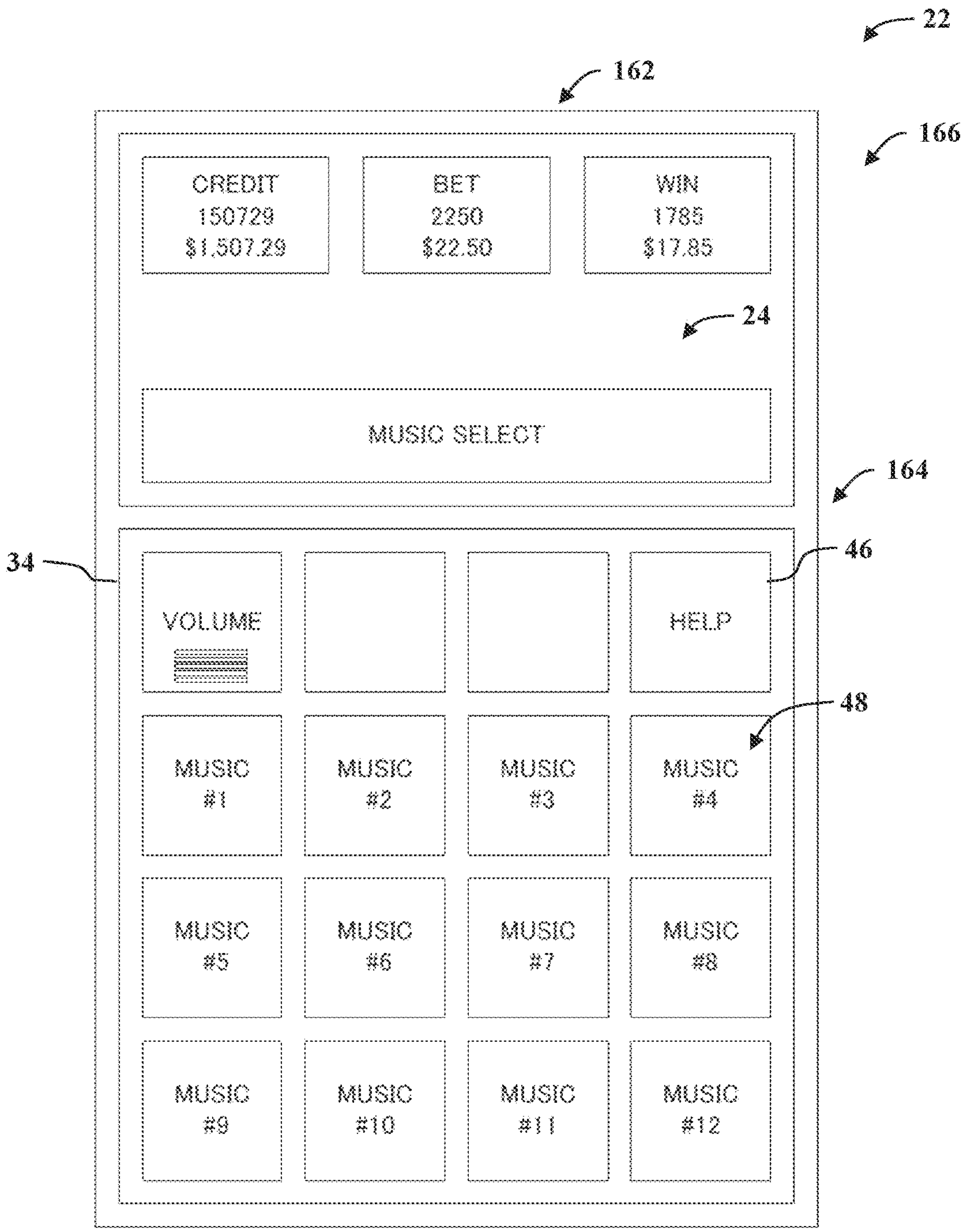
FIGS. 12-14 are exemplary entertaining graphical displays of a game screen including a skill-based wagering game that may be displayed on the gaming machine shown in FIG. 1, according to an embodiment of the present invention.
Figure 13:
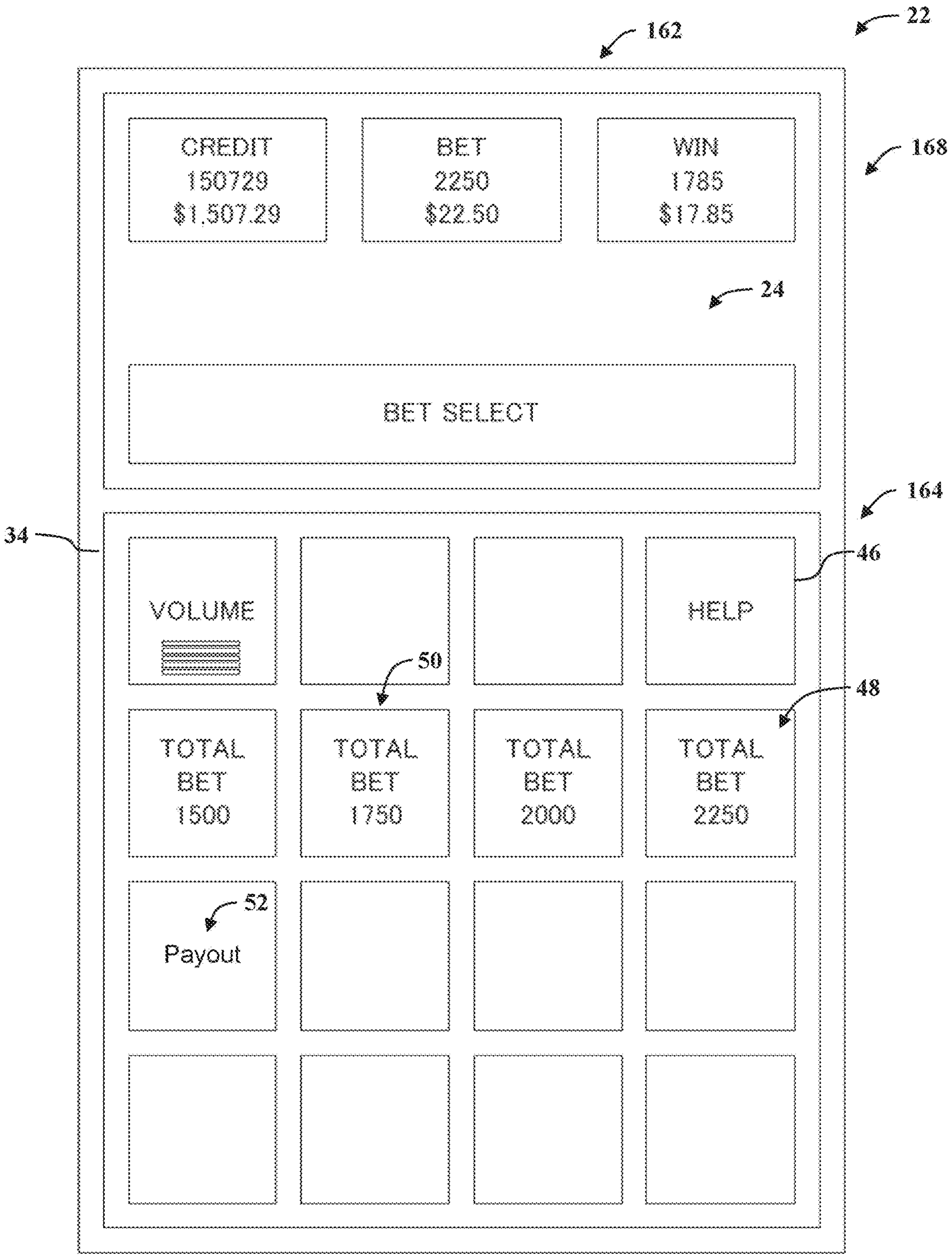

In the illustrated embodiment, the gaming controller 12 initially displays a music selection screen 166 (shown in FIG. 12) including a plurality of music selection operational images 48 to allow the player to select a musical soundtrack for use during the skill-based wagering game 22. FIG. 12 illustrates an initial music selection screen 166 waiting for a player operation. The player selects one of a music title from music #1 to #12 and touch the transparent button displaying the music title.

Upon receiving a player's selection of a musical soundtrack, the gaming controller 12 displays a wagering screen 168 (shown in FIG. 13) on the first display 26. After accepting the player's selection of the music title, the game screen changes to the wagering screen 168 including a "BET SELECT" screen. The player selects one of total bet amount from 1500 credits to 2250 credits and touches transparent button displaying the selected amount. The wagering screen 168 includes instructions for selecting a monetary bet amount to be wagered on the skill-based wagering game 22 including a plurality of betting operational images 48 associated with a plurality of predefined bet amounts.

Figure 14:
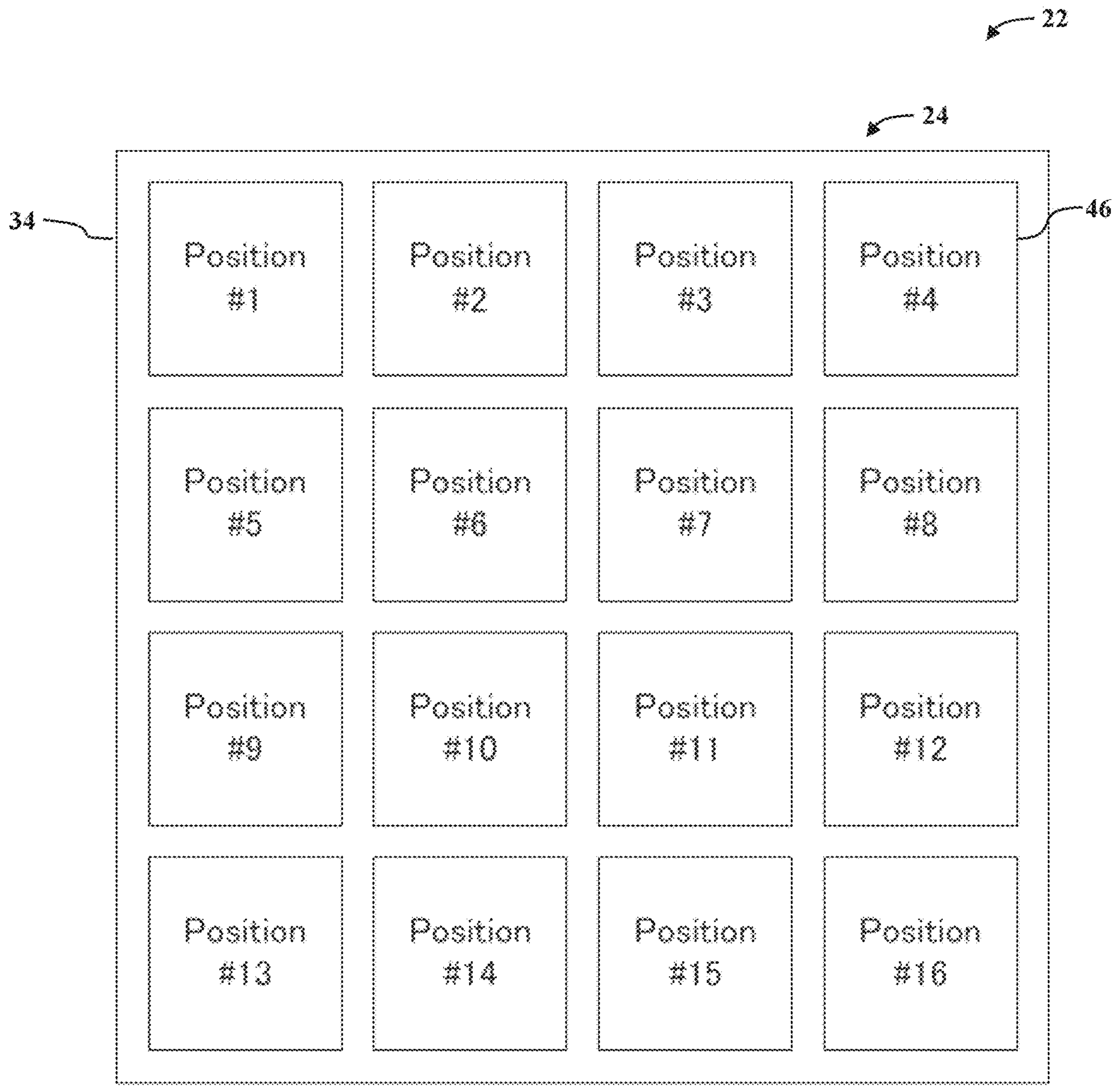

In method step 204, the gaming controller 12 receives a signal from the user input device 16 indicating a wager being placed by the player and initiates the skill-based wagering game 22. The gaming controller 12 accesses the database 84 and selects a timing chart data record 88 associated with the player selected musical soundtrack. In addition, as shown in FIG. 14. The gaming controller 12 selects a timing record 92 for one or more of the touch buttons 46.

In method step 206, the gaming controller 12 selects an award paytable 118 for use with the skill-based wagering game 22. In one embodiment, the gaming controller 12 accesses the database 84 and randomly selects an award paytable 118 from the plurality of award paytables. In another embodiment, the gaming controller 12 access the transition table 134 and randomly selects an award pattern record 136, and initiate the skill-based wagering game 22 using the select award pattern record 136. In one embodiment, the gaming controller 12 may identify a current skill event stage 142 of the skill-based wagering game 22, determine the award paytable associated with the current skill event based on the current skill event stage, and select the award table 118 associated with the current skill event stage. In one embodiment, the gaming controller 12 may initiate the skill based wagering game including a plurality of consecutive skill event stages, with each skill event stage including a predefined number of skill events, and select a corresponding award table for each skill event stage.

In method step 208, the gaming controller 12 determines a number of skill events being included in the skill-based wagering game 22 and randomly selects a skill event record 126 from the selected award paytable 118 for each of the skill event being included in the skill-based wagering game 22. In one embodiment, the gaming controller 12 initiates the skill-based wagering game including a plurality of skill events and randomly select a plurality of skill event records. Each of the plurality of skill events being associated with a corresponding skill event record. For example, in one embodiment, the gaming controller 12 accesses the selected timing chart data record 88 and determines a number of skill events 90 included in the selected timing chart data record 88. For each of the included skill events 90, the gaming controller 12 accesses the selected award table 118 and randomly selects a skill event record 126.

Figure 15:
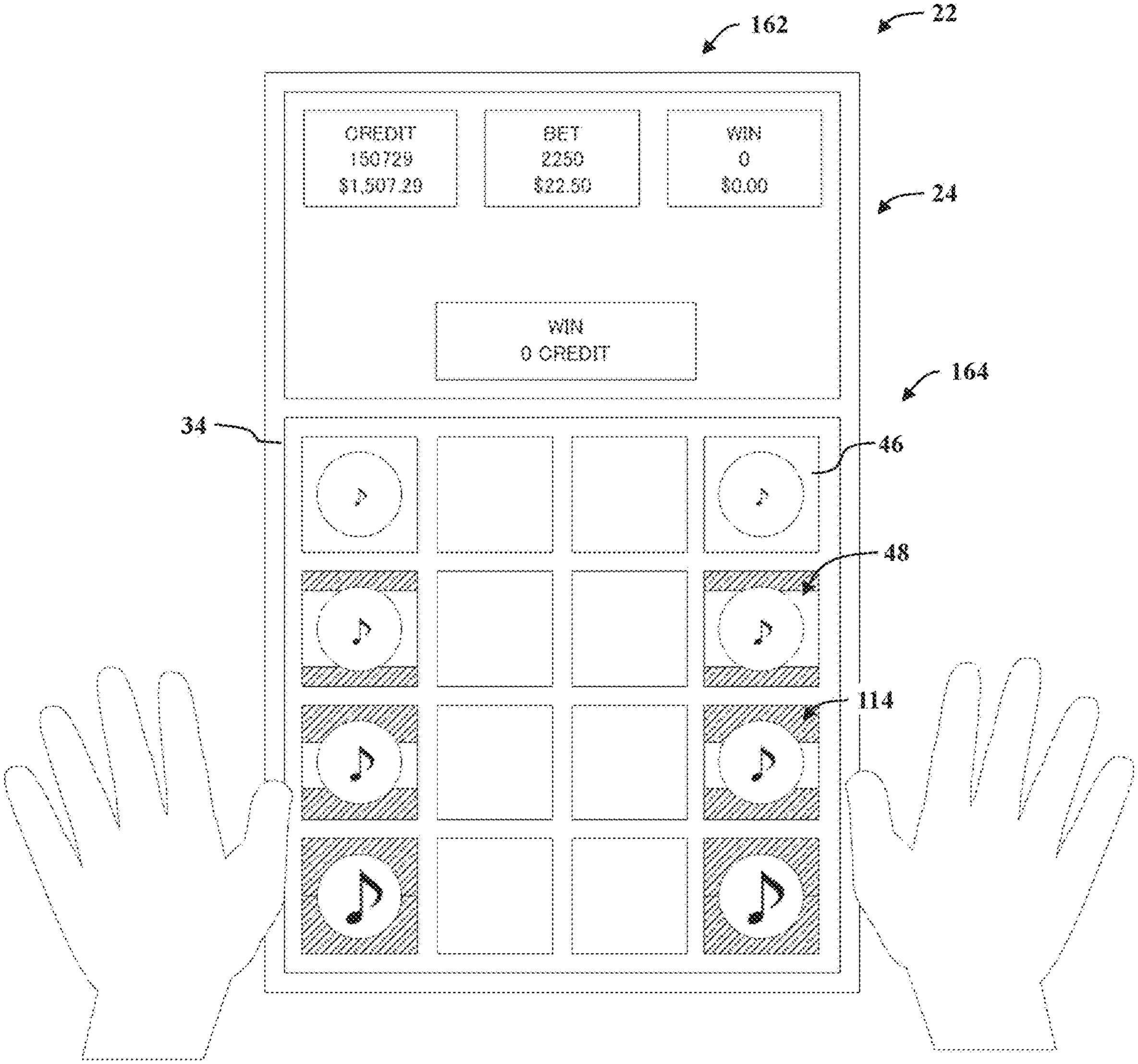
FIGS. 15-16 illustrate a sequence of exemplary entertaining graphical displays of a game screen including a skill-based wagering game that may be displayed on the gaming machine shown in FIG. 1, according to an embodiment of the present invention.
Figure 16:
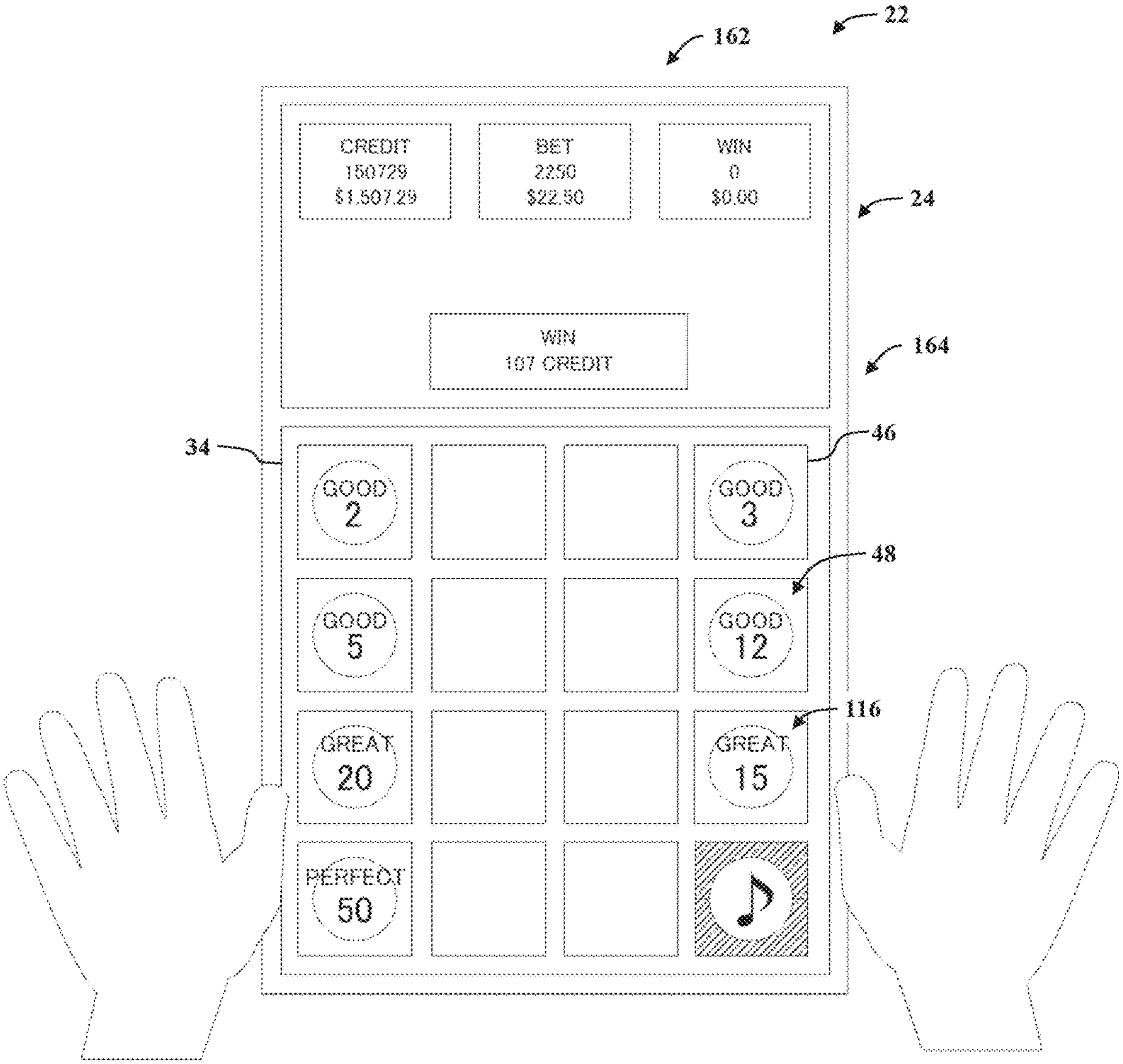

In method step 210, the gaming controller 12 generates and displays a skill event 90 to the player during the skill-based wagering game 22. For example, during the skill-based wagering game 22, the controller 12 generates and displays a skill event associated with the skill-based wagering game and randomly select a skill event record associated with the skill event. In one embodiment, the gaming controller 12 selects an operation timing record to be used with the skill event and displays the skill event including the event time period associated with the operation timing record. The gaming controller 12 also determines the plurality of consecutive operation timing periods within the event time period and identifies a skill level associated with each consecutive operation timing periods. The gaming controller 12 also accesses the skill event record 126, selects the sequential image record associated with the selected skill event record 126 and displays the event images in coordination with the musical soundtrack (as shown in FIG. 15). For example, as shown in FIG. 15, after accepting the player's selection of the total bet amount, the skill-based wagering game is started. In one embodiment, the game play is a similar to a Whac-A-Mole™ game. The gaming machine 10 starts to play the selected music title and display "markers" with animation at respective transparent button positions on LCD unit along with a timing chart corresponding to the selected music title. The player touches the transparent button which displays the marker to the music. During the game, a series of markers are displayed and the player's touch operation is evaluated respectively. Referring to FIG. 16, when the player touches a button panel displaying the marker, the animation of the marker is switched to indication of the player's skill level and earned prize determined by the player's skill level and random number. The earned prizes are accumulated in win meter, In one embodiment, the selected skill event record may include a range of skill level values including a high skill level and a low skill level. The high skill level having a corresponding high award value and the low skill value having a corresponding low award value. The high award value being larger than the low award value. The gaming controller 12 may be programmed to initiate the event time period having a high skill timing period associated with the high skill level and a low skill timing period associated with the low skill level. In addition, the gaming controller 12 may be programmed to initiate the skill-based wagering game including a low skill mode and a high skill mode, with the low skill mode including a corresponding high skill time period that is longer than the high skill time period included in the high skill mode. In one embodiment, the gaming controller 12 may allow the player to select between the high skill mode or the low skill mode. In another embodiment, the gaming controller may randomly select the high skill mode or the low skill mode to initiate the skill-based wagering game. Moreover, the gaming controller 12 may also be programmed to randomly select the high skill mode or the low skill mode for each stage of the skill-based wagering game.

In one embodiment, the gaming controller 12 may be programmed to initiate an initial skill-based free game before initiating the skill-based wagering game. The initial skill-based free game may include a plurality of consecutive skill events including the low skill mode. The gaming controller 12 may determine a player integrated skill level associated with the initial skill-based free game based on the timing of the player's selection inputs associated with each of the consecutive skill events. The gaming controller 12 may initiate the skill-based wagering game including the low skill mode if the player integrated skill level is less than a predefined integrated skill level and initiate the skill-based wagering game including the high skill mode if the player integrated skill level is equal to or greater than the predefined integrated skill level.

In method step 212, the gaming controller 12 receives a player's selection input via the touch button 46 in response to the displayed skill event and determines a player skill level value based on the received player's selection. For example, in one embodiment, the gaming controller 12 detects a player's operation timing associated with the player's selection input and determines a corresponding consecutive operation timing period within the event time period 96 associated with the player's operation timing.

In method step 214, the gaming controller 12 accesses the corresponding skill event record 126 and determines an award value included in the corresponding skill event record 126. In one embodiment, as shown in FIG. 16, the gaming controller 12 selects an award image associated with the determined award value and displays the award image within the touch button 46 for a predefined period of time to notify the player of the corresponding award.

In method step 216, upon the conclusion of the skill-based wagering game 22, the gaming controller 12 determines the total awards being provided to the player based on the award values achieved during each skill event and adjusts a credit balance associated with the player.

With reference to FIG. 9, in method 300, the gaming controller 12 is programmed to display the music selection screen 166 on the display device 14 and accept a player's selection of a music title. Upon receiving the player's music selection, the gaming controller 12 displays the wagering screen 168 and accepts the player's operation to bet a wager. The gaming controller 12 then receives a signal from the player to start the skill-based wagering game, accesses the transition table 134 and randomly selects an RTP award pattern record 136. The gaming controller 12 then displays a plurality of skill events 90 at various touch button positons based on timing chart data record associated with the player's music selection. The gaming controller 12 then determines if a player's operation of a touch button corresponding to a displayed skill event has been detected. If the gaming controller 12 does detects the player's operation of the corresponding touch button, the gaming controller 12 identifies current stage of the skill event, and identifies the RTP award paytable corresponding to the current stage. The gaming controller 12 then determines the player's skill level based on the timing of the player's operation. The gaming controller 12 then randomly determines a player award based on the determined skill level and the identified RTP award paytable. The gaming controller 12 then displays the determined award on the corresponding touch button position and adds the award value to the displayed win meter (shown in FIG. 16). The gaming controller 12 determines if the last skill event has been displayed. If the last skill event has been displayed, the gaming controller 12 transfers the player award from the win meter to a credit meter (shown in FIG. 16). If the last skill event has not been displayed, the gaming controller 12 displays the next skill event included in the timing chart data record. If the gaming controller 12 does not detect player's operation of the touch button corresponding to a displayed skill event, the gaming controller 12 randomly determines a player award based on a low skill level value and the current award paytable, after a predefined period of time has elapsed.

Referring to FIG. 10, in one embodiment, the gaming controller 12 may be programmed to implement method 400 to adjust a difficulty of the skill-based wagering game as the skill-based wagering game progresses through multiple phases. For example, the gaming controller 12 may accept the player's operation to select a music title and accept the player's operation to bet a wager. Upon receiving a signal from the player to start the skill-based wagering game, the gaming controller 12 provides a $1^{st}$ game phase of the skill-based wagering game in a beginner mode using the low skill operation timing record 110. The gaming controller 12 displays the plurality of skill events and determines the player's integrated skill level in the $1^{st}$ game phase. In one embodiment, the integrated skill level is determine based on a total amount of award values received during the $1^{st}$ game phase. Upon completion of the $1^{st}$ game phase, if the player's integrated skill level is more than a predefined threshold value, the gaming controller 12 initiates a $2^{nd}$ phase of the skill-based wagering game using the high skill operation timing record 112. If the player's integrated skill level is less than the predefined threshold value, the gaming controller 12 initiates the $2^{nd}$ phase of the skill-based wagering game using the low skill operation timing record 110.

Referring to FIG. 11, in one embodiment, the gaming controller 12 may be programmed to implement method 500 to initiate a skill-based free game prior to initiating the skill-based wagering game to determine a player's integrated skill level and select a skill mode used during the skill-based wagering game. For example, the gaming controller 12 may accept the player's operation to select a music title and accept the player's operation to bet a wager. Upon receiving a signal from the player to start the skill-based wagering game, the gaming controller 12 provides a $1^{st}$ game phase using a skill-based free game in which the wager is not consumed and an award is not paid out to the player. The $1^{st}$ game phase is initiate in a beginner mode using the low skill operation timing record 110. The gaming controller 12 displays the plurality of skill events and determines the player's integrated skill level in the $1^{st}$ game phase. In one embodiment, the integrated skill level is determine based on a total projected amount of award values received during the $1^{st}$ game phase. Upon completion of the $1^{st}$ game phase, if the player's integrated skill level is more than a predefined threshold value, the gaming controller 12 initiates the skill-based wagering game using the high skill operation timing record 112. If the player's integrated skill level is less than the predefined threshold value, the gaming controller 12 initiates the skill-based wagering game using the low skill operation timing record 110.

Exemplary embodiments of a gaming machine, a gaming system, and a method of providing an award to a player are described above in detail. The gaming machine, system, and method are not limited to the specific embodiments described herein, but rather, components of the gaming machine and/or system and/or steps of the method may be utilized independently and separately from other components and/or steps described herein. For example, the gaming machine may also be used in combination with other gaming systems and methods, and is not limited to practice with only the gaming machine as described herein. Rather, an exemplary embodiment can be implemented and utilized in connection with many other gaming system applications.

A controller, computing device, or computer, such as described herein, includes at least one or more processors or processing units and a system memory. The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Other aspects and features of the present invention can be obtained from a study of the drawings, the disclosure, and the appended claims. The invention may be practiced otherwise than as specifically described within the scope of the appended claims. It should also be noted, that the steps and/or functions listed within the appended claims, notwithstanding the order of which steps and/or functions are listed therein, are not limited to any specific order of operation.

Although specific features of various embodiments of the invention may be shown in some drawings and not in others, this is for convenience only. In accordance with the principles of the invention, any feature of a drawing may be referenced and/or claimed in combination with any feature of any other drawing.

What is claimed is:

1. A gaming machine for providing a skill-based game to a player, comprising:
- a display device configured to display a game screen including a plurality of user input buttons arranged in a matrix using computer generated graphical images;
- a user input device including a player selection device, the player selection device configured to generate a signal indicating a player's selection input associated with each of the user input buttons;
- a database including a plurality of award paytables, each of the award paytables including a plurality of skill level values, each skill level value associated with a plurality of award values, each award value associated with a corresponding selection probability;

a controller coupled to the display device and the user input device, the controller including a processor programmed to:

display a skill-based game on the display device;

generate and display a plurality of consecutive skill events associated with the instance of the skill-based game; and for each displayed skill event:

detect a player's selection input of a corresponding user input button in response to the displayed skill event;

determine a player skill level value based on the received player's selection and determine the plurality of award values associated with the player skill level value; and randomly select an award value from the plurality of award values associated with the player skill level value based on the corresponding selection probabilities; and determine a total award amount based on each selected award amount value associated with the each displayed skill event.

2. The gaming machine of claim 1, wherein the processor is programmed to:

display the skill-based game including the plurality of consecutive skill events displayed with the plurality of user input buttons in a sequential display pattern synchronized to a musical soundtrack.

3. The gaming machine of claim 2, wherein the processor is programmed to:

initiate the skill based game including a plurality of consecutive skill event stages, each skill event stage including a predefined number of skill events; and select a corresponding award table for each skill event stage.

4. The gaming machine of claim 3, wherein the database includes a transition table including a plurality of award pattern records, each award pattern record including a pattern selection probability and a plurality of paytable values, each paytable value indicating a corresponding award paytable and being associated with a corresponding skill event stage, the processor programmed to randomly select an award pattern record from the transition table and initiate the skill based game using the selected award pattern record.

5. The gaming machine of claim 4, wherein the processor is programmed to:

identify a current skill event stage associated with a current skill event being displayed; and determine the award paytable associated with the current skill event based on the current skill event stage.

6. The gaming machine of claim 1, wherein the processor is programmed to:

display each skill event including an event time period including a predefined period of time and an image being displayed during the event time period;

determine a plurality of consecutive operation timing periods within the event time period and identify a skill level associated with each consecutive operation timing periods;

detect a player's operation timing associated with the player's selection input and determine a corresponding consecutive operation timing period associated with the player's operation timing; and determine the corresponding player skill level value based on the corresponding consecutive operation timing period.

7. The gaming machine of claim 6, wherein the selected skill event record includes a range of skill level values including a high skill level and a low skill level, the high skill level having a corresponding high award value and the low skill value having a corresponding low award value, the high award value being larger than the low award value, the processor programmed to initiate the event time period having a high skill timing period associated with the high skill level and a low skill timing period associated with the low skill level.

8. The gaming machine of claim 7, wherein the processor is programmed to initiate the skill-based game including a low skill mode and a high skill mode, the low skill mode including a corresponding high skill time period that is longer than the high skill time period included in the high skill mode.

9. The gaming machine of claim 8, wherein the processor is programmed to:

initiate an initial skill-based free game before initiating the skill-based game, the initial skill-based free game including a plurality of consecutive skill events including the low skill mode;

determine a player integrated skill level associated with the initial skill-based free game based on the timing of the player's selection inputs associated with each of the consecutive skill events; and initiate the skill-based game including the low skill mode if the player integrated skill level is less than a predefined integrated skill level and initiate the skill-based game including the high skill mode if the player integrated skill level is equal to or greater than the predefined integrated skill level.

10. A method of operating a gaming machine, the gaming machine including a display device, a player selection device, and a controller, the method including the controller performing the steps of:

displaying a skill-based game on the display device including a game screen including a plurality of user input buttons arranged in a matrix using computer generated graphical images;

generating a signal indicating a player's selection input associated with each of the user input buttons;

initiating an instance of the skill-based game upon receiving the wager;

accessing a database including a plurality of award paytables, each of the award paytables including a plurality of skill level values, each skill level value associated with a plurality of award values, each award value associated with a corresponding selection probability;

generating a plurality of consecutive skill events associated with the instance of the skill-based game; and for each displayed skill event:

detecting a player's selection input of a corresponding user input button in response to the displayed skill event;

determining a player skill level value based on the received player's selection and determine the plurality of award values associated with the player skill level value; and randomly selecting an award value from the plurality of award values associated with the player skill level value based on the corresponding selection probabilities; and determining a total award amount based on each selected award amount value associated with the each displayed skill event.

11. The method of claim 10, including the steps of: displaying the skill-based game including the plurality of consecutive skill events displayed with the plurality of user input buttons in a sequential display pattern synchronized to a musical soundtrack.

12. The method of claim 11, including the steps of:

initiating the skill based wagering game including a plurality of consecutive skill event stages, each skill event stage including a predefined number of skill events; and selecting a corresponding award table for each skill event stage.

13. The method of claim 12, wherein the database includes a transition table including a plurality of award pattern records, each award pattern record including a pattern selection probability and a plurality of paytable values, each paytable value indicating a corresponding award paytable and being associated with a corresponding skill event stage, the method including the step of randomly selecting an award pattern record from the transition table and initiate the skill based game using the selected award pattern record.

14. The method of claim 13, including the steps of:

identifying a current skill event stage associated with a current skill event being displayed; and determining the award paytable associated with the current skill event based on the current skill event stage.

15. The method of claim 10, including the steps of:

displaying each skill event including an event time period including a predefined period of time and an image being displayed during the event time period;

determining a plurality of consecutive operation timing periods within the event time period and identify a skill level associated with each consecutive operation timing periods;

detecting a player's operation timing associated with the player's selection input and determine a corresponding consecutive operation timing period associated with the player's operation timing; and determining the corresponding player skill level value based on the corresponding consecutive operation timing period.

16. The method of claim 15, wherein the selected skill event record includes a range of skill level values including a high skill level and a low skill level, the high skill level having a corresponding high award value and the low skill value having a corresponding low award value, the high award value being larger than the low award value, the method including the step of initiating the event time period having a high skill timing period associated with the high skill level and a low skill timing period associated with the low skill level.

17. The method of claim 16, including the steps of initiating the skill-based game including a low skill mode and a high skill mode, the low skill mode including a corresponding high skill time period that is longer than the high skill time period included in the high skill mode.

18. The method of claim 17, including the steps of:

initiating an initial skill-based free game before initiating the skill-based game, the initial skill-based free game including a plurality of consecutive skill events including the low skill mode;

determining a player integrated skill level associated with the initial skill-based free game based on the timing of the player's selection inputs associated with each of the consecutive skill events; and initiating the skill-based game including the low skill mode if the player integrated skill level is less than a predefined integrated skill level and initiate the skill-based game including the high skill mode if the player integrated skill level is equal to or greater than the predefined integrated skill level.

* * * * *